United States Patent
Hashimoto et al.

(10) Patent No.: US 7,987,279 B2
(45) Date of Patent: Jul. 26, 2011

(54) CONTROL-RELAY APPARATUS

(75) Inventors: Hiroshi Hashimoto, Fukuoka (JP); Mitsuhiro Sato, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 243 days.

(21) Appl. No.: 12/292,854

(22) Filed: Nov. 26, 2008

(65) Prior Publication Data
US 2009/0248842 A1 Oct. 1, 2009

(51) Int. Cl.
G06F 15/16 (2006.01)
G06F 15/173 (2006.01)
(52) U.S. Cl. .................. 709/230; 709/208; 709/223
(58) Field of Classification Search .............. 709/208, 709/223, 226, 229, 230
See application file for complete search history.

(56) References Cited

U.S. PATENT DOCUMENTS

| | | | |
|---|---|---|---|
| 6,829,288 B2 * | 12/2004 | Orava | 375/132 |
| 7,516,201 B2 * | 4/2009 | Kovacs et al. | 709/223 |
| 7,539,503 B2 * | 5/2009 | Suzuki et al. | 455/507 |
| 7,634,273 B2 * | 12/2009 | Kim et al. | 455/445 |

FOREIGN PATENT DOCUMENTS

| | | |
|---|---|---|
| JP | 2002-171289 | 6/2002 |
| JP | 2006-338417 | 12/2006 |

* cited by examiner

*Primary Examiner* — Hussein A Elchanti
(74) *Attorney, Agent, or Firm* — Staas & Halsey LLP

(57) ABSTRACT

A control-relay apparatus that controls a device to be controlled, according to a control request received from a management device includes a request receiving part that receives, from the management device, control request data containing data indicating a condition that a device to be controlled should satisfy, and data indicating contents of control with respect to a device that satisfies the condition, and stores the control request data in a recording part accessible from the control-relay apparatus, an information obtaining part that obtains device data relating to a device communicable with the control-relay apparatus; and a device control part that, when the device data obtained by the information obtaining part satisfy the condition indicated by the control request data recorded in the recording part, performs control including the contents indicated by the control request data, with respect to the device.

17 Claims, 15 Drawing Sheets

| Policy identifier | Detection condition | | Determination condition | | Action identifier information |
|---|---|---|---|---|---|
| | Detection type | Detection condition | Determination type | Determination condition | |
| 100 | Broadcast | Unmanaged node detection | Equipment information (MIB::SysDescr) Matching | Vendor A | 5000,5002 |
| 101 | Broadcast | Health check NG | Equipment information (MIB::SysDescr) Matching | Vendor B | 5003,5001 |
| 102 | Passive measurement | Packet loss detection | Subnet | 192.168.99.0/24 | 5004 |
| 103 | Passive measurement | Massive data detection | IP value range | 192.168.100.1~ 192.168.100.10 | 5004,5001 |
| 104 | Passive measurement | Attack detection | Port scan determination | 100-port serial scanning | 5006,6000 |
| 105 | - | - | Periodical execution | - | 7000 |
| .. | .. | .. | .. | .. | .. |

FIG. 4

| Action identifier | Action type | Action command | Timing | Detailed control contents |
|---|---|---|---|---|
| 5000 | Addition of device to be controlled | Add internal information | | - |
| 5001 | Deletion of added device to be controlled | Delete internal information | | - |
| 5002 | Start of periodical information collection | Periodically issue SNMP GET | In cycle of 60 seconds | SNMP Add (OID 1.1.1.1, 60 sec, calculation expression = difference from previous value) |
| 5003 | Stop of periodical information collection | Stop issuing SNMP GET | Upon detection | SNMP Del |
| 5004 | Control of transmission rate | Issue rooter command | Upon detection | if eth0 set limit 10Mbps |
| 5005 | Control of device | Notify power off | At 10:00 every night | Power off |
| 5006 | Control of firewall | Add isolation filter | Upon detection | shut IP XX.XX.XX.XX |
| 5007 | Control of firewall | Remove isolation filter | Upon detection | join IP XX.XX.XX.XX |
| 6000 | Notification to administrator | Notify HTTP | Upon detection | Body part MSG : "Attack detected" |
| 7000 | Issuance of health check | Issue health check | In cycle of 300 seconds | Ping XX.XX.XX.XX |
| .. | .. | .. | .. | .. |

| Collection ID | Device ID | Collection type | Collection information | Manipulation expression | Cycle |
|---|---|---|---|---|---|
| 1000 | (No data) | SNMP | OID:1.1.1.1 | Difference from previous value | 60 |
| 1001 | 192.168.100.101/24 | SNMP | OID:1.1.1.2=A<br>OID:1.1.1.3=B | A−B | 60 |
| 1020 | 192.168.110.15/24 | ping | Ping response value | Collection value | 300 |
| 1021 | 192.168.120.10/24 | RTP | RTP value | Collection value | 3600 |
| .. | .. | .. | .. | .. | .. |

FIG. 10B

| Collection ID | Date and time of collection | Collection value |
|---|---|---|
| 1000 | 2007/10/27 10:00:00 | 100 |
| 1001 | 2007/10/27 10:00:00 | 66 |
| 1020 | 2007/10/27 10:00:00 | 11 |
| 1021 | 2007/10/27 10:00:00 | 2222 |
| 1000 | 2007/10/27 10:01:00 | 111 |
| 1001 | 2007/10/27 10:01:00 | 22 |
| 1020 | 2007/10/27 10:05:00 | 45 |
| 1021 | 2007/10/27 11:00:00 | 122 |
| .. | .. | .. |

| Device ID | Communication format | Control information |
|---|---|---|
| 1000 | SNMP | |
| 1001 | SNMP | |
| 1020 | CLI | Port=23, cmdl="ip", ... |
| 1021 | NETCONF | |
| : | : | : |

FIG. 14

CONTROL-RELAY APPARATUS

CROSS-REFERENCE TO RELATED APPLICATION

This application is based upon and claims the benefit of priority of the prior Japanese Patent Application No. 2008-87560, filed on Mar. 28, 2008, the entire contents of which are incorporated herein by reference.

FIELD

The present application discloses matters relating to a control-relay program, a control-relay apparatus, and a control-relay method for relaying control with respect to a device to be controlled, the control being sent from a management device.

BACKGROUND

In recent years, a network management system (hereinafter referred to as NMS) for controlling a plurality of devices to be controlled, which are connected via a network, has been developed and used.

Various methods that enables further advanced control by such a NMS have been proposed (see Patent JP-A-2002-171289 and JP-A-2006-338417, for example). Patent Document 1 discloses a method for controlling all devices with one policy even though the network operation methods thereof that are intended to achieve the same function vary with vendors. Patent Document 2 discloses a proxy apparatus that performs a relaying operation so as to allow a SNMP (simple network management protocol) management apparatus to manage non-SNMP equipment easily. Such a NMS, however, does not have a mechanism for detecting automatically a device to be controlled.

SUMMARY

A control-relay apparatus according to an aspect of the present invention is a control-relay apparatus that controls a device to be controlled, according to a control request received from a management device, and the control-relay apparatus includes: a request receiving part that receives, from the management device, control request data containing data indicating a condition that a device to be controlled should satisfy, and data indicating contents of control with respect to a device that satisfies the condition, and stores the control request data in a recording part accessible from the control-relay apparatus in a state where the condition and the contents of control are associated with each other; an information obtaining part that obtains device data relating to a state or a property of a device communicable with the control-relay apparatus; and a device control part that, when the state or the property of the device indicated by the device data obtained by the information obtaining part satisfies the condition indicated by the control request data recorded in the recording part, performs control with respect to the device indicated by the device data, the control including the contents of control associated with the condition indicated by the control request data.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 4 illustrates exemplary contents of data to be recorded in a policy information table.

FIG. 5 illustrates exemplary contents of data to be recorded in an action information table.

FIG. 10A illustrates exemplary data contents to be recorded in a collection setting table.

FIG. 10B illustrates exemplary contents of data to be recorded in the collection result table.

FIG. 14 illustrates exemplary data contents to be recorded in the device information table.

DESCRIPTION OF EMBODIMENT(S)

Figure 1:
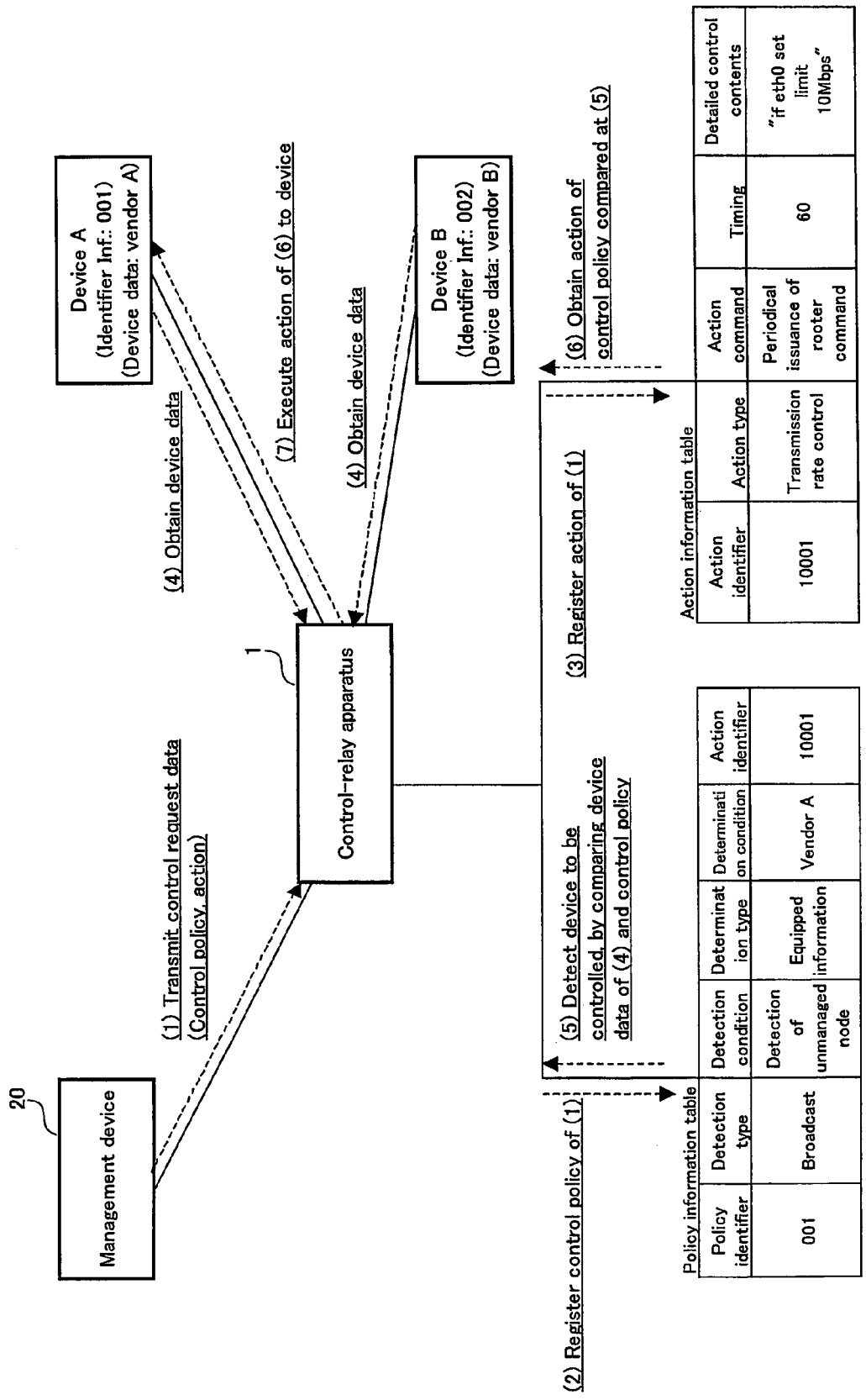
FIG. 1 illustrates a schematic overall configuration of a system including a control-relay apparatus according to Embodiment 1.

In one embodiment of the control-relay apparatus, the request receiving part receives, from the management device, control request data containing data indicating a condition that a device to be controlled should satisfy, and data indicating contents of control with respect to a device that satisfies the condition, and stores the control request data in a recording part. Then, the information obtaining part obtains device data relating to a state or a property of a device communicable with the control-relay apparatus. The device control part determines whether or not the state or the property of the device indicated by the device data satisfies the condition that a device to be controlled should satisfy, indicated by the control request data recorded in the recording part. When the condition is satisfied, the device control part performs control including the contents indicated by the control request data, with respect to the device indicated by the device data. With this, the control-relay apparatus is capable of automatically determining whether or not a device communicable therewith is a device to be controlled, without inquiring the management device. Therefore, for example, when a device to be controlled newly becomes communicable with the control-relay apparatus, the control-relay apparatus also can automatically detect and control the device. As a result, an administrator does not have to execute an operation of setting the addition of a device to be controlled, explicitly in the control-relay apparatus or the like.

Besides, since the device control part controls the device based on control request data recorded in the recording part, a transmission for inquiring control contents to the management device when a device is detected becomes unnecessary. Therefore, an amount of communication between the management device and the control-relay apparatus can be reduced.

It should be noted that the same effect can be obtained by a control-relay program and a control-relay method that use a computer that functions as the above-described control-relay apparatus.

In the control-relay apparatus according to the present embodiment, the request receiving part further receives data indicating a method for obtaining device data of the device communicable with the control-relay apparatus, and the information obtaining part obtains the device data by a method in conformity with the data indicating the obtaining method.

With this, a method for obtaining device data by the information obtaining part is controlled according to data indicating the obtaining method from the management device. Therefore, the management device is allowed to designate a suitable obtaining method according to a purpose of management and an environment of a device to be controlled.

The control-relay apparatus according to the present embodiment may be modified so that the information obtaining part obtains data indicating a communication format of a device communicable with the control-relay apparatus and records the data in association with the device in the recording part, and the apparatus further includes a converting part that, when a state or a property of the device indicated by the device data obtained by the information obtaining part satisfies the condition indicated by the control request data recorded in the recording part, determines a communication format for the device satisfying the condition by referring to the recording part, and converts the contents of control indicated by the control request data to contents in conformity with the communication format, wherein with respect to the device satisfying the condition, the device control part executes the control indicated by the control request data converted by the converting part.

The conversion part converts data indicating contents of control with respect to the device according to the control request data, into contents according to a communication format of the device to be controlled. Therefore, the contents of control indicated by the control request data received by the request receiving part are no longer required to indicate control of contents according to the communication format of each device. As a result, the management device is allowed to control devices with various communication formats without preparing data indicating control contents in which communication formats are taken into consideration.

In the control-relay apparatus according to the present embodiment, the information obtaining part can obtain the device data by transmitting, to the device communicable with the control-relay apparatus, a signal that requests device data relating to a state or a property of the device, and receiving device data from the device.

In the control-relay apparatus according to the present embodiment, the information obtaining part can obtain the device data from a measurement device that monitors the device communicable with the control-relay apparatus and collects data transmitted/received to/from the device.

In the control-relay apparatus according to the present embodiment, the information obtaining part obtains the device data from the device communicable with the control-relay apparatus, by receiving data indicating a control request, together with the data relating to the state or the property of the device.

The control-relay apparatus according to the present embodiment may be modified so that the request receiving part further receives obtaining method data that indicate at least one of obtaining methods (1) to (3) below for obtaining information relating to the device, and the information obtaining part obtains the device data by the obtaining method indicated by the obtaining method data:

(1) a method for obtaining the device data by transmitting, to the device communicable with the control-relay apparatus, a signal that requests device data relating to a state or a property of the device, and receiving device data from the device;

(2) a method for obtaining the device data from a measurement device that monitors the device communicable with the control-relay apparatus and collects data transmitted/received to/from the device; and (3) a method for obtaining the device data from the device communicable with the control-relay apparatus, by receiving data indicating a control request, together with the data relating to the state or the property of the device.

This makes it possible to obtain device data from a device communicable with the control-relay apparatus by at least one of the three methods (1) to (3) above. Therefore, by a suitable method according to a purpose of management and an environment of a device to be controlled, the information obtaining part can obtain device data.

In the control-relay apparatus according to the present embodiment, the request receiving part can receive, from the management device, control request data containing data indicating condition that a device to be controlled should satisfy, and data indicating contents and a timing of control with respect to a device that satisfies the condition, and store the control request data in a recording part, and the device control part can control the device according to the timing and the contents of control indicated by the control request data.

The foregoing configuration allows a device to be controlled according to a timing and control contents indicated by the control request data. Therefore, the device control part does not have to inquire the management device for control contents at a timing of controlling a device. Besides, the control-relay apparatus is allowed to control the device to be controlled a plurality of times, based on one set of control request data from the management device. As a result, an amount of communication between the management device and the control-relay apparatus can be reduced.

The embodiment of the present invention may be modified so that the request receiving part receives, from the management device, collection setting data that indicate collection information collected from the device satisfying the condition indicated by the control request data recorded in the recording part, and a method for manipulating the collection information, and stores the collection setting data in the recording part; and the device control part obtains the collection information indicated by the collection setting data from the device satisfying the condition, and manipulates the collection information by the manipulation method indicated by the collection setting data.

With the foregoing configuration, information held by the device to be controlled is collected to the control-relay apparatus and manipulated, according to collection information indicated by the collection setting data and the method for manipulating the information. Therefore, a counting processing by the management device, and an amount of transmission between the management device and the control-relay apparatus can be reduced. For example, when devices to be controlled are many in number, the amount of the counting processing with respect to information collected from devices and the amount of transmission are increased; but since the counting processing and the communication are executed mainly between the control-relay apparatus and the devices to be controlled, loads of processing and communication on the management device side can be reduced.

Embodiment 1

[Schematic Overall Configuration of System]

FIG. 1 illustrates a schematic overall configuration of a system including a control-relay apparatus according to the present embodiment. As illustrated in FIG. 1, a control-relay apparatus 1 is capable of communicating with a management device 20, a device A, and a device B. More specifically, the system is configured so that the management device 20 controls the device A or the device B via the control-relay apparatus 1.

The management device 20 performs constitutional information setting, security setting, operation control, or the like with respect to a device (device A or B, for example) connected therewith via the control-relay apparatus 1. The management device 20 may be a device for implementing an NMS or an EMS (element management system); or it may be an administrator's terminal with which contents of control with respect to the device A or B are input by an administrator. It should be noted that the NMS is a system that serves as a main entity that controls network equipment, and is composed of, for example, a computer in which an application for controlling devices connected with a network is installed.

The control-relay apparatus 1 receives control request data from the management device 20, and controls the device A as a proxy of the management device 20 based on the control request data. For example, the control-relay apparatus 1 transmits, to the device A, an operation instruction signal generated according to the control request data, and receives a processing result from the device A. The processing result received from the device A is notified to the management device 20.

The types and purposes of use of the device A and device B are not limited particularly, as long as they are information devices that can be controlled by the management device 20 and are communicable with the control-relay apparatus. For example, general-purpose computers such as personal computers or servers, other communication equipment having specific functions of a rooter, a switching hub, and a firewall, OA (office automation) equipment, household electrical appliances, and information equipment such as mobile terminals can be devices to be controlled. Examples of OA equipment include telephones, facsimiles, printers, and copying machines. Examples of the household electrical appliances include radios, video receivers, DVD recorder/reproducers, air conditioners, luminaires, washing machines, microwave ovens, refrigerators, and game machines. Examples of the mobile terminals include mobile telephones, PDAs (personal digital assistants), hand-held game machines, and electronic dictionaries.

When a device to be controlled is communication equipment having a function of a rooter, the management apparatus 20 performs, for example, the setting of a communication address for identifying the communication equipment (for example, IP address of communication equipment), the setting of a rooting table or a forwarding table of a protocol, and the like. The management device 20 also is capable of performing the security setting for communication equipment (for example, user account setting, and other various settings of firewall, VLAN (virtual local area network), VPN (virtual private network)), and the like. Such control can be performed by using a protocol such as NETCONF.

It should be noted that a protocol for communication between the control-relay apparatus 1 and the device A or B, or between the control-relay apparatus 1 and the management device 20 is not limited to one type. The number of the management device and the number of the other devices communicable with the control-relay apparatus 1 are not limited to the numbers as illustrated in FIG. 1, and two or more management device and three or more devices may be connected with the control-relay apparatus 1 in a wired manner or in a wireless manner.

[Outline of Operation of the Control-Relay Apparatus 1]

Next, an outline of an operation of the control-relay apparatus 1 is described with reference to FIG. 1. Here, an exemplary case where the device A is a rooter is described. The management device 20 first transmits control request data containing a control policy and an action to the control-relay apparatus 1 (see (1) of FIG. 1). The control-relay apparatus 1 records the control policy in a policy information table (see (2)), and records the action in an action information table (see (3)). The policy information table and the action information table are, for example, tables in a database configured by using a recording part accessible from the control-relay apparatus 1.

Here, the control policy is exemplary data indicating conditions for a device to be controlled by the management device 20. In the example illustrated in FIG. 1, a control policy is associated with data (i.e., action) indicating contents of control with respect to a device that satisfies the conditions indicated by the control policy. In other words, the control request data are data that indicate condition-action type rules. Besides, in the present example, the control policy includes data indicating a method for obtaining device data to be used for determining whether or not a device (hereinafter referred to as a node) connected with the control-relay apparatus satisfies the foregoing conditions. The control policy may be generated automatically by the management device 20, or may be inputted by an administrator.

The policy information table and the action information table in FIG. 1 display exemplary contents of a control policy and those of an action, respectively. In this exemplary case, one record of a control policy to be recorded in the policy information table includes a policy identifier, a detection type, a detection condition, a determination type, a determination condition, and an action identifier of an action corresponding to the control policy. The detection type represents a type of a method for obtaining device data to specify a node to be controlled. The detection condition represents a condition that a device from which device data are to be obtained should satisfy. In other words, the detection condition is data indicating from what device the device data are to be obtained. The determination type represents a type of a matter to be determined in the specification of a node to be controlled. The determination condition represents a condition used in the determination. The action identifier is an identifier of the action corresponding to the control policy. Thus, one record of a control policy is associated with one or a plurality of actions.

One record of an action includes an action identifier, an action type, an action command, a timing for executing the action, and detailed control contents. With respect to a control policy of one record, actions of a plurality of records may be associated and recorded. In this case, records indicating the plurality of actions to be executed by a node satisfying conditions indicated by the control policy are recorded in the action information table, in an order in which the actions are to be executed. Such a set of actions to be executed by a node in a predetermined execution order is called "scenario" in some cases.

In the above-described operations (1) to (3), the management device 20 sets, in the control-relay apparatus 1, a control policy for specifying devices to be controlled, and an action indicating control contents to be executed with respect to the devices to be controlled.

The control-relay apparatus 1 obtains, from communicable nodes (the devices A and B in the example illustrated by FIG. 1), device data used for determining whether or not each node is a node to be controlled, according to the control policy recorded in the policy information table (see (4)). The device data are data indicating a state and a property of a device. Here, the control-relay apparatus 1 obtains device data by using a method indicated by the detection type in the control policy. For example, in the example illustrated in FIG. 1, in which the detection type is "Broadcast", the control-relay apparatus 1 periodically transmits a broadcast packet for obtaining device data, to all the communicable nodes (the devices A and B). With this, the control-relay apparatus 1 detects an unmanaged node (node not to be controlled). The control-relay apparatus 1 obtains device data by receiving a reply containing device data, from each unmanaged node thus detected. Here, a case where the devices A and B are detected as unmanaged nodes is described.

For example, a broadcast packet having contents of an inquiry about information indicated by the determination type of the control policy, that is, about "Equipment information", is transmitted from the control-relay apparatus 1. The control-relay apparatus 1 receives, from the device A, for example, device data containing identification information "001" and equipment information "Vendor A" as a response to the broadcast packet. From the device B, the control-relay apparatus 1 receives device data containing identification information "002" and equipment information "Vendor B".

The control-relay apparatus 1 compares a property or a state of a device indicated by device data received from a node, with the determination condition and the detection condition of the control policy, and if they match, the node is determined to be a node to be controlled (see (5)). In the example illustrated in FIG. 1, the equipment information of the device A, i.e., "vendor A", and the determination condition "Vendor A" match, and the device with the identification information "001" is an unmanaged node (that is, the device satisfies the detection condition), whereby the device A is determined as a node to be controlled. It should be noted that the determination about whether or not a device is an unmanaged node is enabled by, for example, recording identification information of each device to be controlled in the control-relay apparatus 1.

As described above, when the device A is determined as a node to be controlled, the control-relay apparatus 1 obtains control contents (for example, timing, detailed control contents) of an action corresponding to the control policy from the action information table, using the action identifier "10001" of the control policy as a key (see (6)). On the other hand, if information of the device indicated by the device data and the control policy do not match in the foregoing comparison, the operation (4) is repeated periodically, for example.

At (6), for example, the control-relay apparatus 1 refers to an action command, a timing, and detailed control contents of the action with the action identifier "10001", and executes control indicated by the detailed control contents, with respect to the device A, at this timing (see (7)). In the example illustrated by FIG. 1, the control-relay apparatus 1 enters a rooter command indicated by the detailed control contents to the device A periodically in a cycle of 60 seconds. It should be noted that the timing of the control may be described so as to be contained in "Detailed control contents". In this case, the control-relay apparatus 1 may analyze and execute the detailed control contents with use of a program installed in the control-relay apparatus 1.

An outline of an operation of the control-relay apparatus 1 has been described so far; the contents and recording format of a control policy and an action, however, are not limited to the examples described above.

Further, with the above-described operation, the following effect is achieved. First, a node (the device A in the above-described example) to be controlled by the control-relay apparatus 1 can be detected automatically. Then, network traffic from the management device 20 to the node to be controlled can be reduced. In other words, the above-described configuration makes it possible for the control-relay apparatus 1 to autonomously control a device to be controlled, periodically or at a specific moment, in place of the management device 20. As a result, most of traffic of a communication path from the management device 20 to the device A or B to be controlled, which conventionally was indispensable, can be reduced to only a communication path from the control-relay apparatus 1 to the device A or B.

Still further, by the control-relay apparatus 1 autonomously controlling the device A or B according to the control policy and the action, the number of operations for transmitting a control signal from the management device 20 can be decreased. As a result, the load on the management device 20 can be reduced.

[Configuration of the Control-Relay Apparatus 1]

Figure 2:
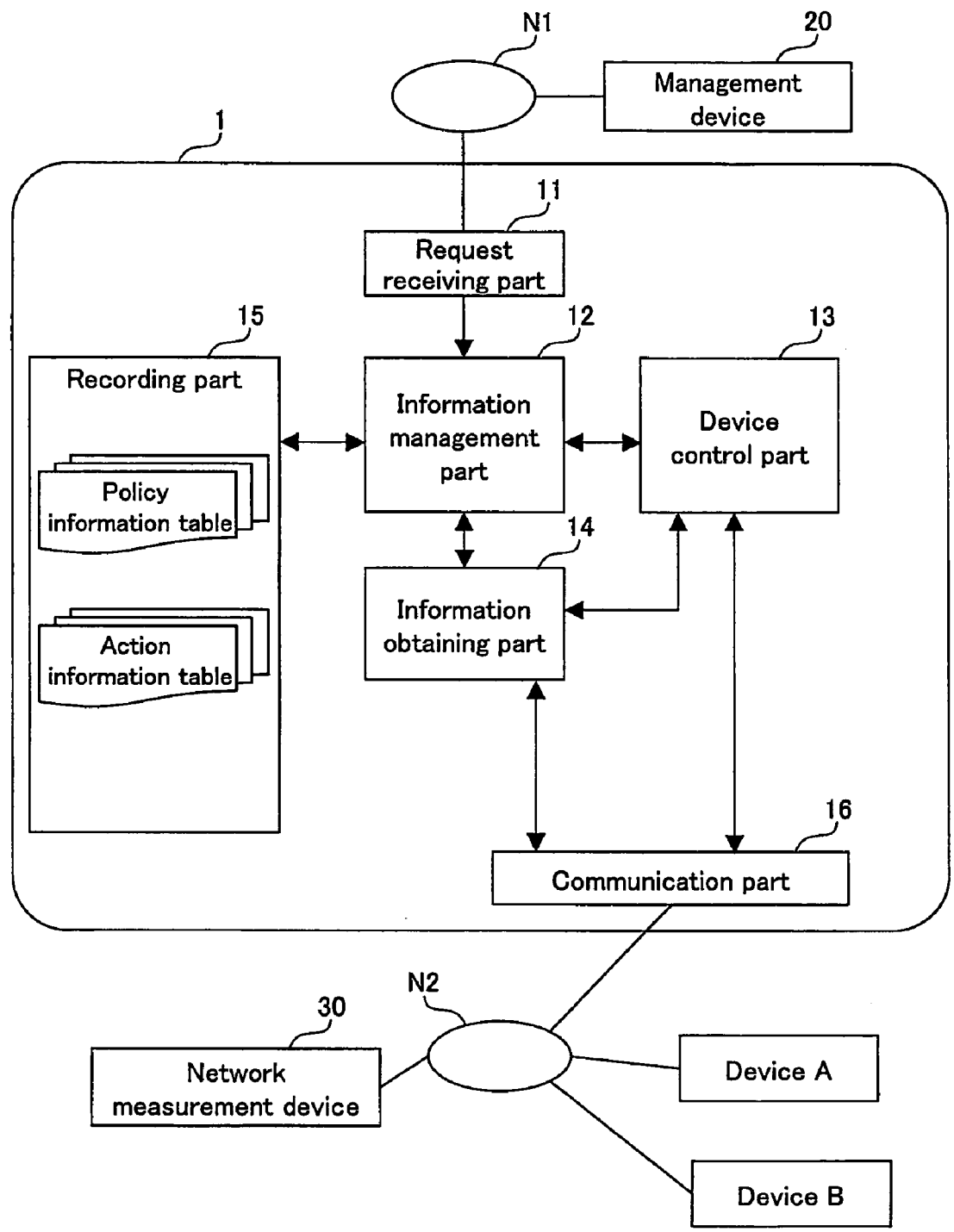
FIG. 2 is a functional block diagram illustrating a configuration of the control-relay apparatus according to Embodiment 1.

FIG. 2 is a functional block diagram illustrating a configuration of the control-relay apparatus 1. As illustrated in FIG. 2, the control-relay apparatus 1 includes a request receiving part 11, an information management part 12, a device control part 13, an information obtaining part 14, a recording part 15, and a communication part 16. The control-relay apparatus 1 is connected with the management device 20 via a network N1, and is connected with a network measurement device (measurement device) 30, the device A, and the device B via a network N2.

The request receiving part 11 receives control request data from the management device 20, and requests the information management part 12 to write a control policy and an action contained in the control request data into the recording part 15.

The information management part 12 is an interface that connects the request receiving part 11, the device control part 13, and the information obtaining part 14 with the recording part 15. The information management part 12 receives and executes a request of reading or writing of a control policy and an action from/into the recording part 15, from the request receiving part 11, the device control part 13, and the information obtaining part 14.

The information obtaining part 14 obtains device data from a device communicable with the control-relay apparatus 1 (that is, a device on the network N2). The information obtaining part 14 may obtain device data relating to the devices A and B on the network N2, which are obtained by the network measuring device 30, or alternatively, may obtain device data directly from each of the devices A and B. The information obtaining part 14 refers to a method for obtaining device data, which is indicated by the control policy recorded in the recording part 15, via the information management part 12. The information obtaining part 14 obtains device information of the devices A and B in a manner according to the obtaining method thus referred to.

The network measurement device 30 is a measurement device that collects data transmitted or received by a device (the device A or B) on the network N2. The network measurement device 30 performs, for example, passive measurement with respect to data of communication by nodes (the devices A and B in the example illustrated by FIG. 2) on the network N2, so as to collect data.

Here, the passive measurement is to obtain data relating to a node by monitoring data transmitted through a network (including wireless network) to which a node to be measured is connected, without executing a processing for requesting data with respect to the node, or alternatively, to obtain a signal passing through a passive measurement device so as to obtain information relating to a network such as an amount of flow, a load, a quality, and the like.

The network measurement device 30 may be provided at, for example, a collision domain that is identical to a node to be subjected to passive measurement, and may obtain data relating to the node by monitoring a transmission signal (transmission data) at the collision domain. Alternatively, in the case where a node to be subjected to passive measurement is a rooter, for example, the network measurement device 30 connected with a mirror port may collect (capture) communication data from the rooter.

The device control part 13 compares states and properties of the devices A and B indicated by the device data of the devices A and B obtained by the information obtaining part 14 with the control policy in the policy information table recorded in the recording part 15, so as to determine whether or not the devices A and B are devices to be controlled. When determining that at least one of the devices A and B is a device to be controlled, the device control part 13 obtains control contents indicated by an action corresponding to the foregoing control policy from the action information table. The device control part 13 transmits a control signal in accordance with the control contents thus obtained, to the device determined to be a device to be controlled, via the communication part 16.

The communication part 16 is an interface that connects the control-relay apparatus 1 with the network N2. The communication part 16 receives data to be transmitted from the device control part 13 and the information obtaining part 14 toward the network N2, and transmits the same to the network N2, by converting the data format thereof as required. Besides, the communication part 16 passes the data received from the network N2 to the device control part 13, the information obtaining part 14, or the like, by converting the data format thereof as required.

The control relay apparatus 1 may be composed of, for example, a general-purpose computer such as a personal computer or a server machine, or a special-purpose apparatus incorporating a computer. Functions of respective functional parts including the request receiving part 11, the information management part 12, the device control part 13, the information obtaining part 14, and the communication part 16 are implemented by a CPU incorporated in a computer executing a predetermined program. Therefore, a program for causing a computer to function as the foregoing respective functional parts, and a recording medium that stores the foregoing program also are included in embodiments of the present invention. This applies to respective functional parts in FIG. 8 and FIG. 13 that will be described later. Besides, the recording part 15 is embodied by a recording medium incorporated in a computer, or an external recording device accessible from a computer.

It should be noted that the configuration of the control-relay apparatus 1 is not limited to the example illustrated by FIG. 2. For example, the respective functional blocks of the control-relay apparatus 1 may be divided and provided in a plurality of computers connected with one another. Further, the example illustrated by FIG. 2 has a configuration such that the network N1 to which the management device 20 is connected, and the network N2 to which the devices A and B are connected, are separate networks, but these networks may be one same network.

[Processing for Setting Control Policy and Action]

Figure 3:
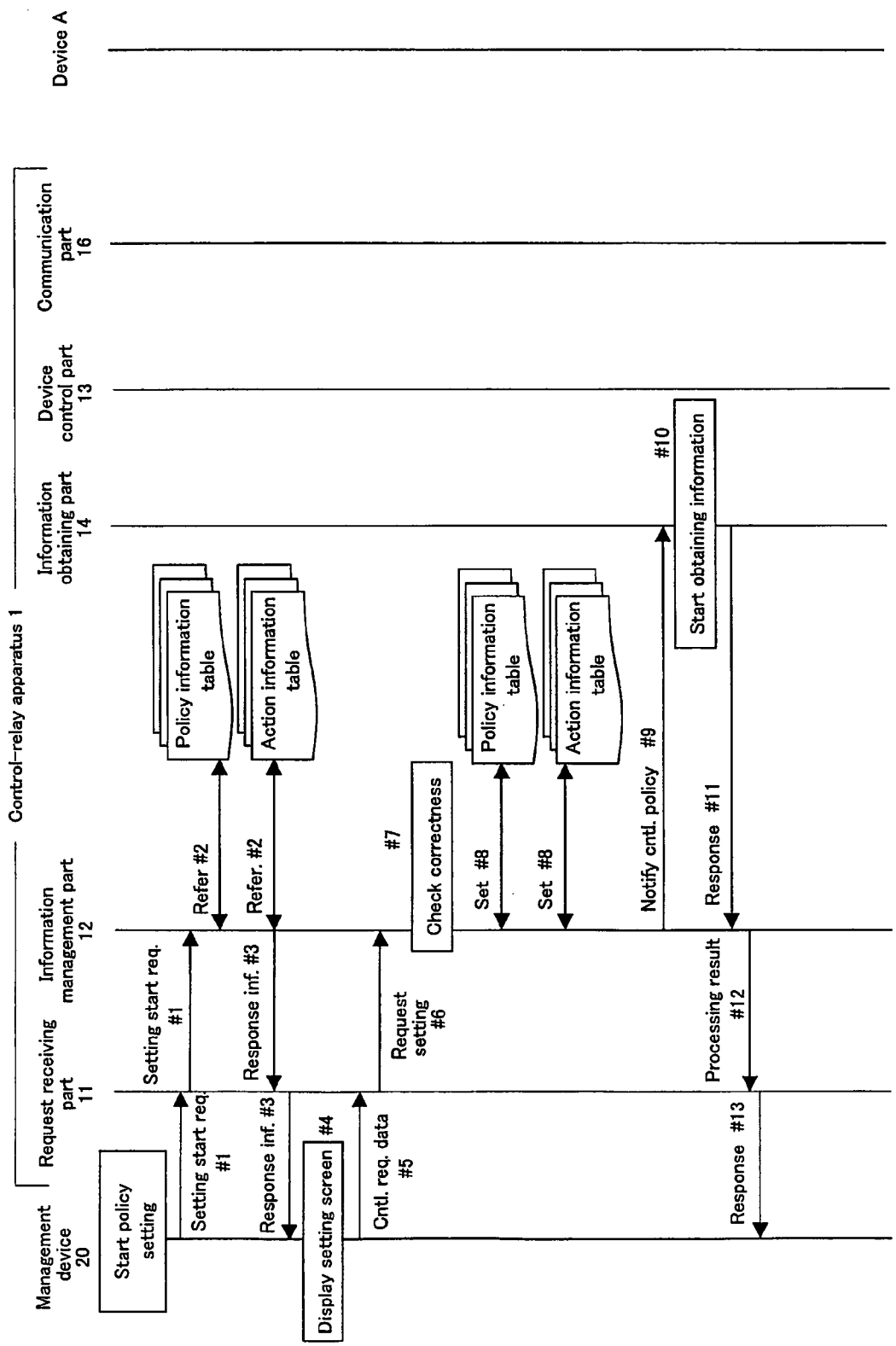
FIG. 3 is a sequence diagram illustrating an exemplary processing for setting control policy and action.

FIG. 3 is a sequence diagram that illustrates an exemplary processing in the case where the control-relay apparatus 1 receives control request data from the management device 20, and sets a control policy and an action. In the example illustrated by FIG. 3, the management device 20 first transmits a "Setting start request" message to the request receiving part 11 of the control-relay apparatus 1, in order to register a control policy and an action in the control-relay apparatus 1 (#1).

Here, the management device 20 may generate the setting start request message automatically, or an administrator may input an instruction for transmission of the setting start request message into the management device 20. In the latter case, the management device 20 may be an administrator's terminal through which the administrator inputs control contents.

When receiving a setting start request message, the request receiving part 11 sends a request for reference to the information management part 12 (#1). The information management part 12 refers to the policy information table and the action information table in the recording part 15 (#2), and responds back to the request receiving part 11 by sending information necessary for setting, as response information (#3). The request receiving part 11 responds back to the management device 20 by sending the response information thereto (#3). The response information contains, for example, information about control policies and actions that can be set, and information about control policies and actions that are set in the policy information table and the action information table at present.

This allows the management device 20 to cause control policies and actions that the response information indicates to be displayed on a screen of a display (not illustrated) provided in the management device 20 (#4). The administrator is allowed to select a desired combination of a control policy and an action from the control policies and actions displayed on the screen. It should be noted that this selection may be performed by the management device 20 automatically. Thus, the management device 20 is allowed to generate control request data by performing selection, addition, change, or deletion with respect to the control policies and actions in the response information, for example.

This results in that the control request data contain control policies and actions. Here, an exemplary case is described, in which a control policy contains information of (broadcast, unmanaged node detection, equipment information, vendor A), as information that indicates a detection type, a detection condition, a determination type, and a determination condition, and an action contains information of (periodical information collection start, SNMP get periodical issuance, "SNMP Add OID 1.1.1.1., 60 sec, difference from previous value") as information that indicates an action identifier, an action command, and control contents.

The management device 20 transmits generated control request data to the request receiving part 11 (#5). When receiving the foregoing control request data, the request receiving part 11 requests the information management part 12 to set control policies and actions contained in the control request data in the recording part 15 (#6).

The information management part 12 checks correctness of the control policies and actions contained in the control request data (#7). Examples of the correctness checking include the checking of whether or not a detection condition is duplicated, the checking of whether or not an action that cannot be associated with the detection condition is designated, and the checking of insufficiency/excessiveness of the set items such as "no action designation".

When determining that there is no problem as a result of the correctness checking, the information management part 12 records the control policies and the actions in the policy information table and the action information table, respectively (#8). FIG. 4 illustrates exemplary contents of data to be recorded in the policy information table. The record with the policy identifier "100" is a control policy newly recorded this time. FIG. 5 illustrates exemplary contents of data to be recorded in the action information table. The record with the action identifier "5002" is an action newly recorded this time.

The information management part 12 notifies the control policy added/updated to/in the policy information table, to the information obtaining part 14 (#9).

The information obtaining part 14 starts obtaining information by an obtaining method in accordance with the notified control policy (#10). The information obtaining part 14 specifies device data to be obtained, for example, according to the detection type and the detection condition of the control policy (details of the device data obtainment processing will be described later). Then, the information obtaining part 14 transmits a response to the control policy notification (#9) to the information management part 12 (#11). When receiving this response, the information management part 12 sends a processing result with respect to the setting request (#6) to the request receiving part 11 (#12). The request receiving part 11 transmits a response to the control request data (#5) to the management device 20 (#13).

[Exemplary Operation of Information Obtaining Part 14]

Figure 6:
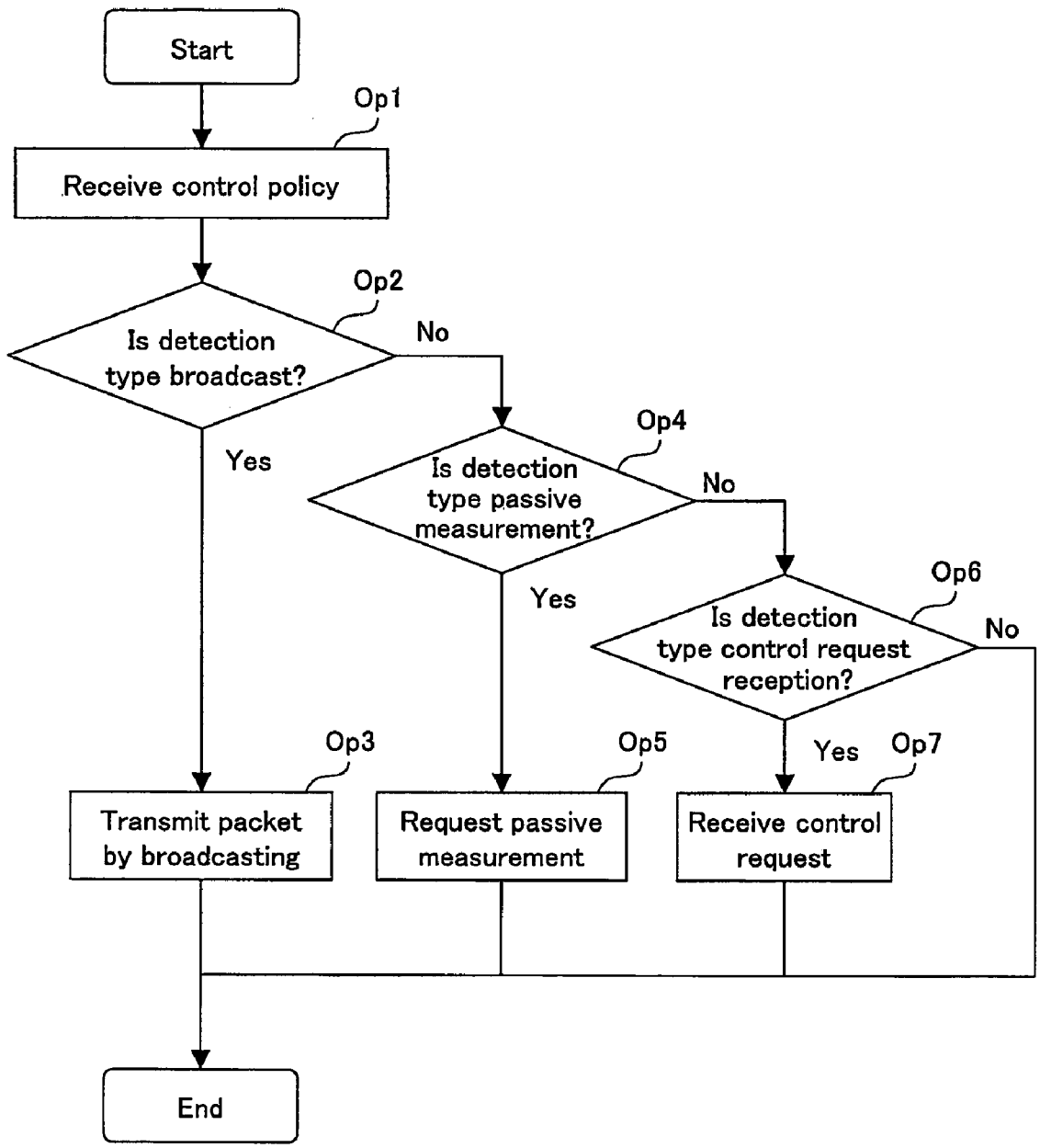
FIG. 6 is a flowchart of an exemplary operation of an information obtaining part after receiving the notification of a control policy.

Here, the following describes an exemplary operation that the information obtaining part 14 performs after starting the information obtainment processing at #10 in FIG. 3. FIG. 6 is a flowchart of an exemplary operation of the information obtaining part 14 after receiving the notification of the control policy (#9 in FIG. 3) from the information management part 12. Upon receiving the notification of the control policy (Op1), the information obtaining part 14 determines whether or not a detection type indicated by the control policy is "Broadcast" (Op2).

<Exemplary Operation of "Broadcast">

When the detection type of the control policy is "Broadcast" (Yes at Op2), the information obtaining part 14 executes a processing operation for transmitting a broadcast packet to the network N2 (Op3). For example, the information obtaining part 14 periodically transmits a broadcast packet, and obtains device data from each node (the devices A and B) on the network N2 as a response to the foregoing transmission. More specifically, the information obtaining part 14 transmits a signal that requests information necessary for specifying a node to be controlled, in a broadcast packet format.

The following describes a case where, for example, the control policy notified at Op1 is a record with a policy identifier "100" in the policy information table illustrated in FIG. 4. The determination type of the foregoing record is "Equipment information (MIB::SysyDescr)". This indicates "SysDescr" in a system sub-tree of MIB-II (Management Information Base-II) of SNMP (Simple Network Management Protocol). In this case, the information obtaining part 14 broadcasts a signal of a GET request for obtaining information indicated by this determination type.

It should be noted that, as a modification of the foregoing processing, the information obtaining part 14 may detect an unmanaged node first by broadcasting, obtain an IP address of the unmanaged node, and transmit, to the foregoing IP address, a request signal for requesting device data necessary for determining whether or not it is a device to be controlled. In this case, the configuration may be made such that the control-relay apparatus 1 or the network measurement device 30 has, for example, a table that stores data indicating managed nodes, and the information obtaining part 14 detects an unmanaged node by referring to the foregoing table.

The above-described information obtainment processing by broadcasting, which is executed at Op3, is an example of a method for obtaining device data by transmitting a signal for actively requesting necessary information, to a device communicable with the control-relay apparatus 1. By obtaining device data by such a method, data held by each device can be collected surely and speedily. It should be noted that such a method of actively obtaining device data is not limited to the broadcasting of the above-described example.

<Exemplary Operation of "Passive Measurement">

When the detection type is "Passive measurement" (Yes at Op4), the information obtaining part 14 transmits, to the network measurement device 30, a request message that commissions passive measurement (Op5). In doing so, the information obtaining part 14 may notify the network measurement device 30 of, for example, a detection condition of a control policy as contents of the request. With this, for example, a range of the network N2 to be subjected to passive measurement, a type of data to be obtained, or the like is notified to the network measurement device 30.

The following describes a case where, for example, the control policy notified at Op1 is a record with a policy identifier "102" in the policy information table illustrated in FIG. 4. The information obtaining part 14 transmits a detection condition "Packet loss detection", along with a request message that requests passive measurement, to the network measurement device 30. The network measurement device 30 monitors packets transmitted through the network N2, and detects packet loss. When detecting packet loss, the network measurement device 30 transfers, to the information obtaining part 14, the packets in the transmission with which the packet loss has occurred. These packets are transferred further to the device control part 13, for example, and are used in determination about whether or not the determination condition of the control policy is satisfied (i.e., whether or not Subnet is "192.168.99.0/24").

The above-described information obtainment processing by the passive measurement carried out at Op5 is one example of the information obtaining method for obtaining device data; in this exemplary information obtaining method, the device data are obtained from the network measurement device that collects data transmitted/received to/from devices communicable with the control-relay apparatus 1. By obtaining information of a device by such a method, data indicating a communication state of the device that varies with time can be collected. It should be noted that such an information obtaining method is not limited to the processing at Op5 described above.

<Exemplary Operation of "Control Request Reception">

In the case where the detection type is "control request reception" (Yes at Op6), the information obtaining part 14 starts waiting for a control request from nodes (the devices A and B) connected with a network (Op7). For example, the device A may have a function of transmitting a control request together with device data (equipment information such as identification information or vendor, for example) to the control-relay apparatus 1. When the information obtaining part 14 receives, for example, a control request from the device A together with device data, it passes the control request to the device control part 13. The device control part 13 compares the device data of the device A with the control policy, and determines whether or not the device A satisfies the detection condition and the determination condition. When the device A is determined to satisfy these conditions, the device A is specified as a node to be controlled.

As described above, with an operation illustrated in FIG. 6, information of a device can be obtained by various methods. Therefore, various types of information can be obtained as information used as a detection condition and a determination condition for a device to be controlled. It should be noted that an example illustrated in FIG. 6 is configured so that any one of the three information obtainment processings at Op3, Op5, and Op7 is executed, but it may be configured so that two or more of the three information obtainment processings are executed, for example. Besides, the types of the information obtaining methods are not limited to the foregoing three.

[Processing for Control Policy Determination and Action Execution]

Figure 7:
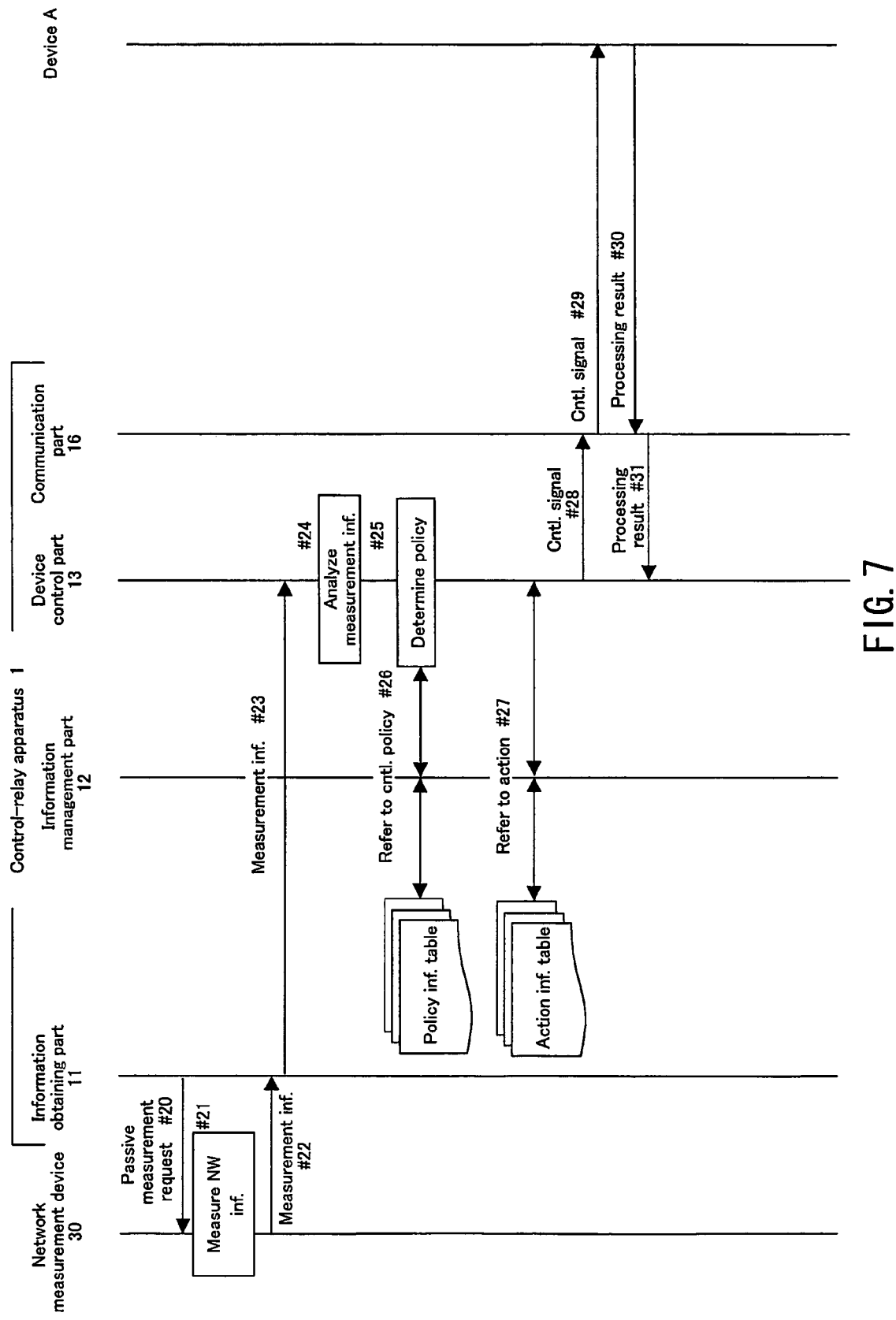
FIG. 7 is a sequence diagram illustrating an exemplary processing in which the control-relay apparatus specifies a device to be controlled and controls the device.

Next, the following describes an exemplary processing in which the control-relay apparatus 1 specifies a device to be controlled and executes an action with respect to the device to be controlled, according to a control policy, based on device data obtained from the network measurement device 30. FIG. 7 is a sequence diagram illustrating an exemplary processing in which the control-relay apparatus 1 specifies a device to be controlled and controls the device, based on the device data obtained from the network measurement device 30.

In FIG. 7, first, a request for passive measurement is notified from the information obtaining part 14 to the network measurement device 30 (#20). This request processing is similar to the above-described request for passive measurement at Op5 in FIG. 6. Upon the foregoing request, the information obtaining part 14 can, for example, notify a detection condition of a control policy to the network measurement device 30. With this detection condition, the network measurement device 30 can determine a range of passive measurement on the network or the type of device data to be obtained, based on the detection condition.

The following describes, as an example, a case where a detection condition "Massive data detection" indicated by a control policy of a record with a policy identifier "103" in the policy information table illustrated in FIG. 4 is notified to the network measurement device 30 upon a passive measurement request.

The network measurement device 30, receiving the request, executes passive measurement (#21). For example, the network measurement device 30 monitors data transmitted through the network N2, and detects a node engaged in transmission of data in an amount exceeding a predetermined threshold value. For example, the network measurement device 30 counts a total number of packets transmitted/received by each node on the network N2, and detects nodes with the total number of packets exceeding a threshold value. Here, it is assumed that, for example, the devices A and B are detected as such.

In this case, the network measurement device 30 transfers respective packets transmitted/received by the devices A and B, as respective pieces of measurement information (device data), to the information obtaining part 14 (#22). The packets of the measurement information having been transferred to the information obtaining part 14 are transferred to the device control part 13 (#23).

The device control part 13 analyzes received measurement information, and extracts information relating to the devices A and B (#24). For example, the device control part 13 extracts an IP address from each of the devices A and B. Based on the respective extracted information (IP addresses) of the devices A and B, the device control part 13 determines whether or not each of the devices A and B satisfies a detection condition of a control policy (#25). Here, the device control part 13 can refer to the control policy in the policy information table via the information management part 12 (#26). In this case, it is determined whether or not the IP address of each of the devices A and B satisfies a condition indicated by a determination type "IP value range" and a determination condition "192.168.100.1~192.168.100.10". The following describes a case where the device A is determined to be a device to be controlled.

When a device satisfying the detection condition of the control policy (the device A) is detected at #25, the device control part 13 refers to an action corresponding to the control policy in the action information table, via the information management part 12 (#27). Action identifiers of actions corresponding to the control policy with a policy identifier "103" are "5004" and "5001". The device control part 13 obtains the records with these action identifiers from the action information table. The device control part 13 generates control signals according to the records thus obtained, and transmits the same to the device A via the communication part 16 (#28, #29). The device A sends processing results with respect to the control signals (#30, #31).

For example, the device control part 13 refers to a timing "Upon detection" and detailed control contents "if eth0 set limit 10 Mbps" in the record with the action identifier "5004" in the action information table of FIG. 5. "Upon detection" indicates the timing when a device to be controlled is detected. "if eth0 set limit 10 Mbps" indicates a control command. Therefore, the device control part 13 transmits a control command "if eth0 set limit 10 Mbps" to the device A immediately after the device A is detected at #25. With this, for example, an upper limit of a transmission rate of data at the device A is set to 100 Mbps.

With the foregoing processing, the data transmission rate of a node engaged in transmission of a large amount of data in the network N2, that is, the data transmission rate of the device A, is controlled. In this processing, for example, when there are a plurality of nodes engaged in transmission of a large amount of communicated data, it also is possible to perform the transmission rate control with respect to the plurality of nodes. In this case, the transmission rate limitation is executed with respect to the plurality of nodes, without the management device 20 transmitting a control signal to each of the plurality of nodes. Therefore, the number of times of transmission of a control signal by the management device 20 can be reduced. In the foregoing processing, since no transmission is generated between the management device 20 and the control-relay apparatus 1, no load is imposed on the network N1.

An exemplary case where the amount of data transmitted by the device A is controlled has been described above, but other various types of controls can be executed by the operation illustrated in FIG. 7, according to the contents of the control policy and action recorded in the recording part 15.

For example, in the case where a record with a policy identifier "104" illustrated in FIG. 4 is recorded, the information obtaining part 14 requests the network measurement device 30 for attack detection. When detecting, for example, a port scan with respect to the device A, the network measurement device 30 notifies port scan information to the device control part 13 via the information obtaining part 14. The device control part 13 determines whether or not the port scan with respect to the device A, which is indicated by the notified port scan information, matches a determination condition indicated by a control policy with the policy identifier "104". Here, the device control part 13 determines that the port scan with respect to the device A matches the control policy if the foregoing port scan is a serial scan of 100 (or more) ports. In this case, actions with action identifiers "5006" and "6000" designated by the control policy are executed successively.

The device control part 13 obtains detailed information of the actions to be executed, by referring to the action information table (see FIG. 5) regarding the actions with the action identifiers "5006" and "6000". In this example, the action type of the action with the action identifier "5006" is "Firewall control", and the action command thereof is "Add isolation filter". Therefore, the device control part 13 generates a control signal that instructs a firewall of the device to be controlled (here, the device A) to add a filter command for blocking access to IP information of the device to be controlled (the device A), and notifies the control signal to the communication part 16. The communication part 16 transmits a command for a protocol adapted to a device to which the control signal has been inputted (here, the device is the firewall of the device A), according to the control contents thus notified.

Embodiment 2

Figure 8:
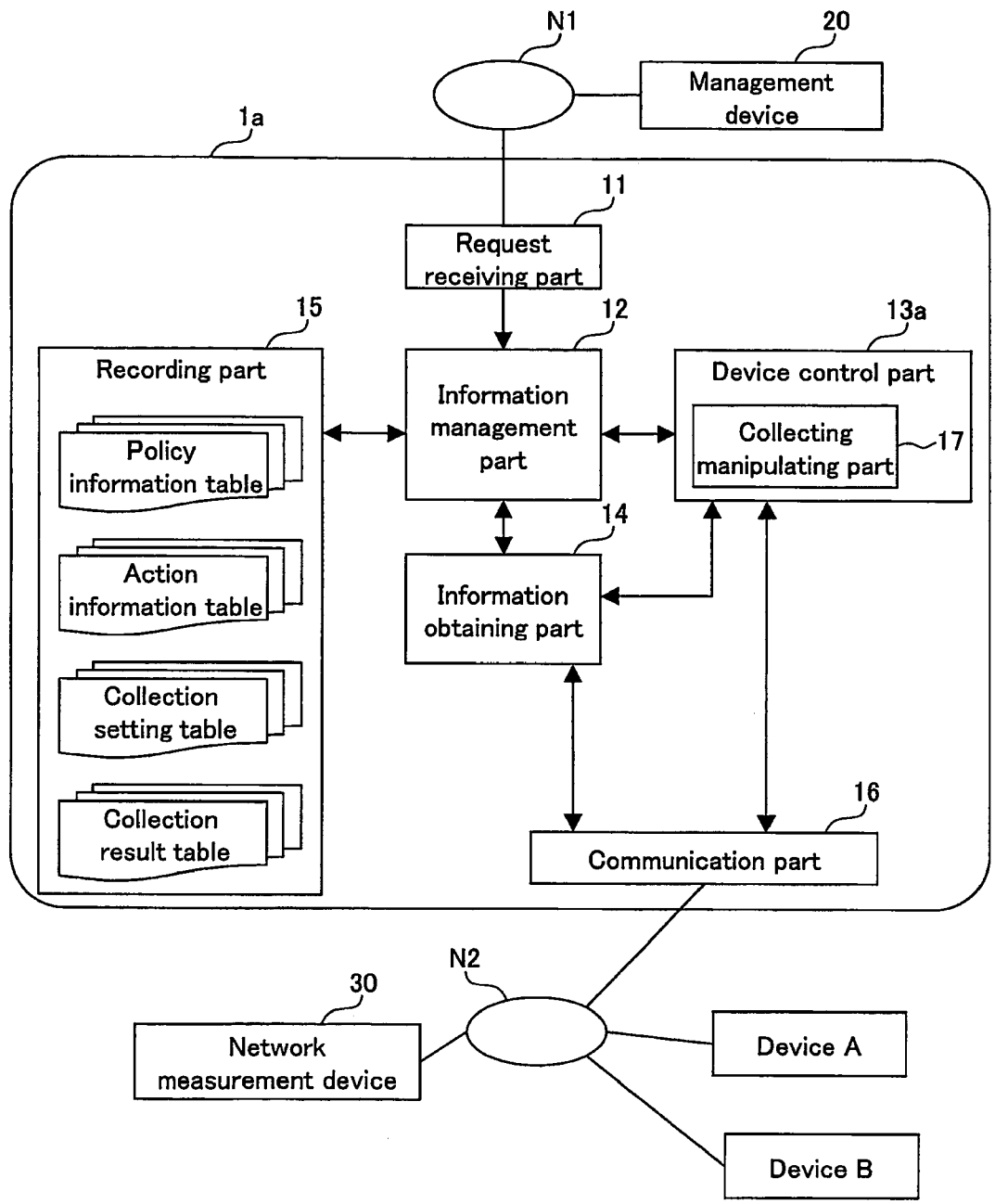
FIG. 8 is a functional block diagram illustrating a configuration of a control-relay apparatus according to Embodiment 2.

FIG. 8 is a functional block diagram illustrating a configuration of a control-relay apparatus 1a according to the present embodiment. In FIG. 8, the same functional blocks as those in FIG. 2 are denoted with the same numerals. In the present embodiment, it is assumed that control request data from the management device 20 contain information that requests collection of information, or collection and manipulation of information, from a device to be controlled. Therefore, the control-relay apparatus 1a further has a function of collecting information from a device to be controlled, based on control request data, and manipulating the information as required. More specifically, in the control-relay apparatus 1a, a device control part 13a further includes a collecting manipulating part 17. Besides, in the recording part 15, a collection setting table and a collection result table are recorded.

When the request receiving part 11 receives control request data indicating a request for information collection or information collection and manipulation, the information management part 12 records collection setting data, in addition to a control policy and an action. The collection setting data are needed in collecting information from a device to be controlled. Examples of the collection setting data include data indicating information to be obtained, obtaining means, an obtaining timing, an obtaining method, a device from which the information is obtained, and the like. The collection setting data are generated, for example, by the information management part 12 or the request receiving part 11, based on an action contained in the control request data.

The device control part 13a, like in Embodiment 1, compares device data obtained by the information obtaining part 14 with a control policy in a policy information table recorded in the recording part 15, so as to specify a device to be controlled. Then, the device control part 13a generates a control signal with respect to the device to be controlled, and causes the communication part 16 to transmit the same.

To the collection setting data in the collection setting table, the collecting manipulating part 17 adds data indicating that the device specified by the device control part 13a as a device to be controlled is a target from which information should be obtained. Then, according to the collection setting data in the collection setting table, the collecting manipulating part 17 requests the device to be controlled for information. As a result, information collected from the device to be controlled is recorded in the collection result table. Here, the collecting manipulating part 17 is allowed to manipulate information collected according to the collection setting data.

[Processing for Setting Control Policy, Action, and Collection Setting Data]

Figure 9:
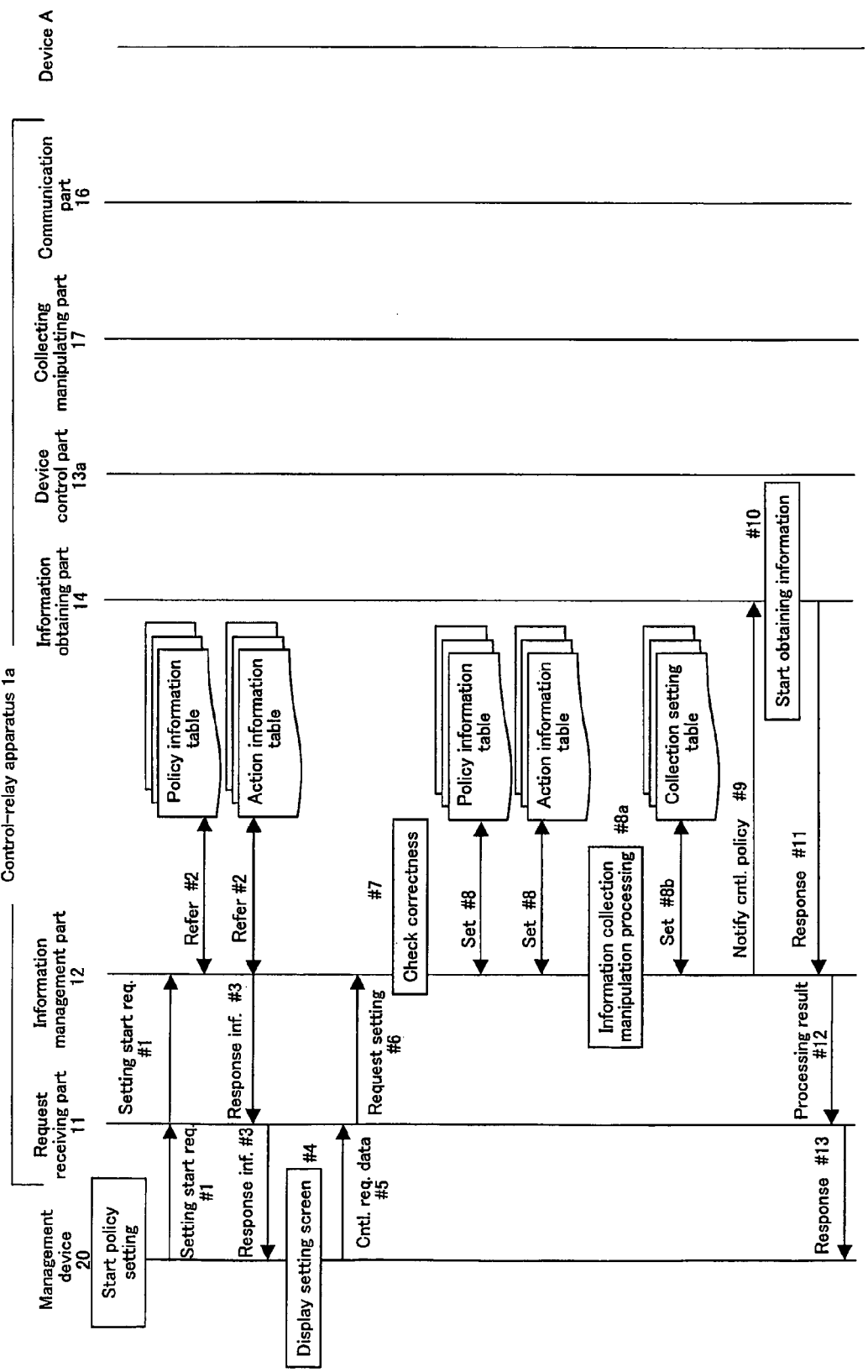
FIG. 9 is a sequence diagram illustrating an exemplary processing for setting a control policy, an action, and collection setting data.

FIG. 9 is a sequence diagram illustrating an exemplary processing in the case where the control-relay apparatus 1a receives control request data from the management device 20 and sets a control policy, an action, and collection setting data. Operations #1 to #8 in FIG. 9 are similar to the operations #1 to #8 in FIG. 3. At #8, the information management part 12 records, in the action information table, an action contained in control request data from the management device 20. Then, the information management part 12 determines whether or not the recorded action contains an information collection processing, or an information collection manipulation processing (#8a). For example, the foregoing determination can be made based on an action type contained in a record of an action recorded.

In the action information table illustrated in FIG. 5, records with an action identifier "5002" and an action identifier "5003" are exemplary actions indicating information collection and manipulation. The action type of the record of "5002" is "Start of periodical information collection", which indicates an action of starting a processing of periodically collecting information from a device to be controlled. The action command "Periodically issue SNMP GET" is a notation of a command for giving a device an instruction of periodical information collection start. The detailed control contents contain an action "SNMP add" (setting of information collection processing by using a SNMP protocol), information to be collected "OID:1.1.1.1", a cycle of information collection "60 sec", and a computation expression "Difference from previous value" to be used in manipulation of the collected information.

The following describes an exemplary case where a record with an action identifier "5002" is recorded at #8. In this case, at #8a, the information management part 12 determines that an action indicating information collection and manipulation is recorded in the action information table. Then, the information management part 12 generates collection setting data based on the foregoing record, and records the data in the collection setting table (#8b).

For example, the information management part 12 extracts information to be collected, information collecting means, a manipulation expression, a timing of collection (for example, cycle), and the like from an action command and detailed control contents contained in this record, and records these in the collection setting table, as collection setting data.

FIG. 10A illustrates exemplary data contents to be recorded in the collection setting table. In the example illustrated in FIG. 10A, one record contains a collection ID, a device ID, a collection type, collection information, a manipulation expression, and a cycle. The device IP is an IP address of a device to be controlled, from which information is to be collected. The collection type indicates means for collecting information. For example, "SNMP" and "ping" in the collection type indicate execution of a GET request and execution of a ping command, respectively, with respect to MIB (management information base) of SNMP. Further, "RTP" indicates, for example, that by using RTP (real time transport protocol), an effective bandwidth, a delay time, and the like of a communication path relating to the device to be controlled are measured. The collection information indicates information to be collected. For example, OID is an object identifier in MIB, and information to be obtained is specified according to an OID value. The manipulation expression indicates a calculation expression or a calculation method used in manipulation of collected information. The cycle indicates a cycle in which information is collected. Regarding the device IP, it should be noted that after a device to be controlled is detected with respect to a corresponding action, the IP address of the device to be controlled is recorded.

In the collection setting table of FIG. 10A, a record with a collection ID "1000" is a record newly recorded at #8b, when a record with an action identifier "5002" is recorded. At this time, since a device to be controlled, corresponding to the action with the action identifier "5002", is not detected, data of a device IP are not recorded yet. The subsequent processing of #9 to #13 is similar to the processing of #9 to #13 in FIG. 3.

[Processing of Control Policy Determination and Information Collection and Manipulation]

Figure 11:
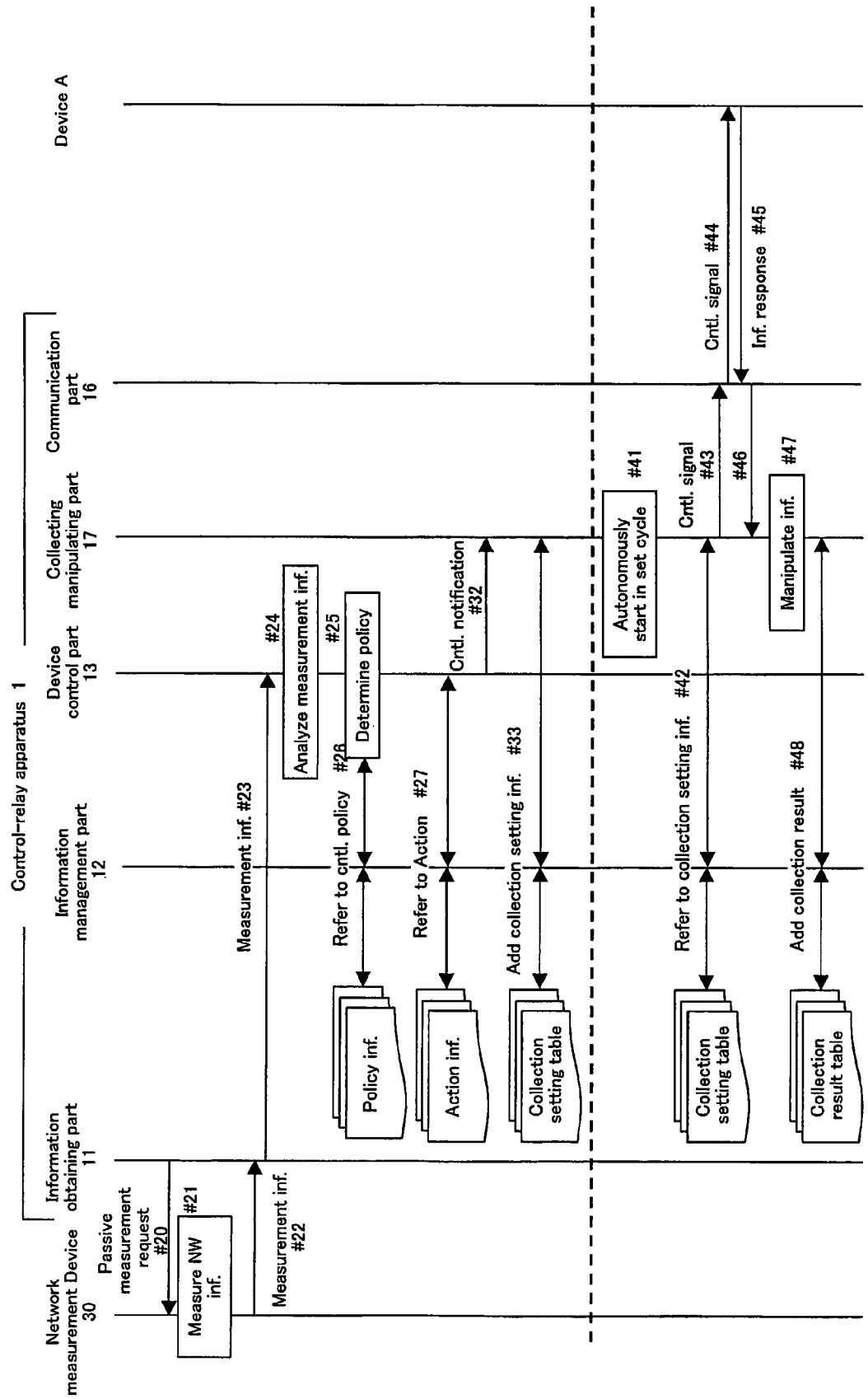
FIG. 11 is a sequence diagram illustrating an exemplary processing in which a control-relay apparatus $1a$ collects information from a device to be controlled.

Next, an exemplary case is described where the control-relay apparatus 1a specifies a device to be controlled, collects information from the device, and manipulates the information, according to a control policy, based on data obtained from the network measurement device 30. FIG. 11 is a sequence diagram illustrating an exemplary processing in which the control-relay apparatus 1a specifies a device to be controlled, based on information obtained from the network measurement device 30, and collects information from the specified device.

The processing of #20 to #27 illustrated in FIG. 11 is similar to the processing of #20 to #27 in FIG. 7. The following describes an exemplary operation in the case where an action referred to by the device control part 13 at #27 is an action recorded at #8 in FIG. 9 of the above-described example (action identifier: "5002"). This action is an action for information collection manipulation processing. Therefore, the control device 13 notifies data indicating the device to be controlled that is specified at #25 (IP address of the device A, for example) to the collecting manipulating part 17.

The collecting manipulating part 17 adds the notified data indicating the device to be controlled to the collection setting table. More specifically, an IP address of the device A as the device to be controlled is recorded in a "Device IP" field in a record with a collection ID "1000" in the collection setting table illustrated in FIG. 10A.

Thus, data indicating a device to be controlled are added to the record with the collection ID "1000" in the collection setting table in the above-described manner, and thereafter, a processing of #41 to #48 is repeated in a set cycle of "60" seconds. In other words, the collecting manipulating part 17 autonomously starts the collection manipulation processing specified by the collection ID "1000" in a cycle of 60 seconds (#41).

In the collection manipulation processing with the collection ID "1000", the collecting manipulating part 17 first refers to the record with the collection ID "1000" in the collection setting table, and obtains a device IP "192.168.100.100/24", collection information "OID: 1.1.1.1", and a manipulation expression "Difference from previous value" (#42). Then, the collecting manipulating part 17 transmits a control signal (GET request in SNMP, for example) for collecting information indicated by the collection information "OID: 1.1.1.1" to the device A indicated by the device IP, via the communication part 16 (#43, #44). Here, the collection information "OID: 1.1.1.1" indicates a cumulative number of packets transferred by the device A, as an example.

Then, the collecting manipulating part 17 receives collection information (the cumulative number of transferred packets) from the device A, as a response to the control signal (#45, #46). The collecting manipulating part 17 manipulates the received cumulative number of transferred packets, according to the manipulation expression "Difference from previous value" (#47). Here, as an example, a difference between the previously received cumulative number of transferred packets and the currently received cumulative number of transferred packets is calculated. The calculated difference is recorded in the collection result table along with a date and time of collection, via the information management part 12 (#48).

FIG. 10B illustrates exemplary contents of data to be recorded in the collection result table. In the example illustrated in FIG. 10B, a collection ID, a date and time of collection, and a collection value are recorded in a state of being associated with one another. The foregoing difference is recorded as a collection value.

Thus, information collected from the network N2 and manipulated according to the collection setting data in the collection setting table is recorded in the collection result table. By so doing, information that the management device 20 requests is collected and manipulated by the control-relay apparatus 1a. As a result, the load on the management device 20 and the load on the network N1 between the control-relay apparatus 1a and the management device 20 are reduced.

In the above-described exemplary processing, information is collected from one device to be controlled, but information can be collected from a plurality of devices in the same manner. Further, the processing repeated in the above-described set cycle of #41 to #48 is executed for every collection ID. Therefore, when the devices to be controlled and the types of information to be collected increase, a massive amount of the collection manipulation processing is needed. However, since all the collection counting processing is executed by the side of the control-relay apparatus 1a and the network N2, the loads on the management device 20 and the network N1 never increase.

It should be noted the information to be collected and the manipulation are not limited to those in the above-described example. For instance, as the collection and manipulation, the following processings (1) to (3) are possible: (1) a periodical information collection processing, such as collection of a CPU usage rate or a buffer usage rate of a device to be controlled in a cycle of 1 second; (2) in a case where the device to be controlled is, for example, a rooter, a manipulation processing such as a processing of calculating a packet loss ratio from a total number of packets transferred by the rooter and a total number of transfer failures among the same; and (3) a processing of determining whether or not collected information exceeds a certain threshold, and recording a determination result value. Thus, information that a device to be controlled does not possess can be generated by manipulation. Further, for example, it also is possible to manipulate information obtained from a plurality of devices to be controlled. For example, it also is possible that an average value of the numbers of the packets received per unit time by the devices to be controlled that are present in one network (intracorporate LAN, etc.) may be calculated, and is used as a collection value.

The following is another concrete example of the collection setting data indicating manipulation of information. A record with a collection ID "1001" in FIG. 10A indicates that a difference "A-B" between a value "A" obtained in response to a GET request with respect to OID "1.1.1.2", and a value "B" obtained in response to a GET request with respect to OID "1.1.1.3" is calculated.

[Reference to Collection Information by Management Device]

Figure 12:
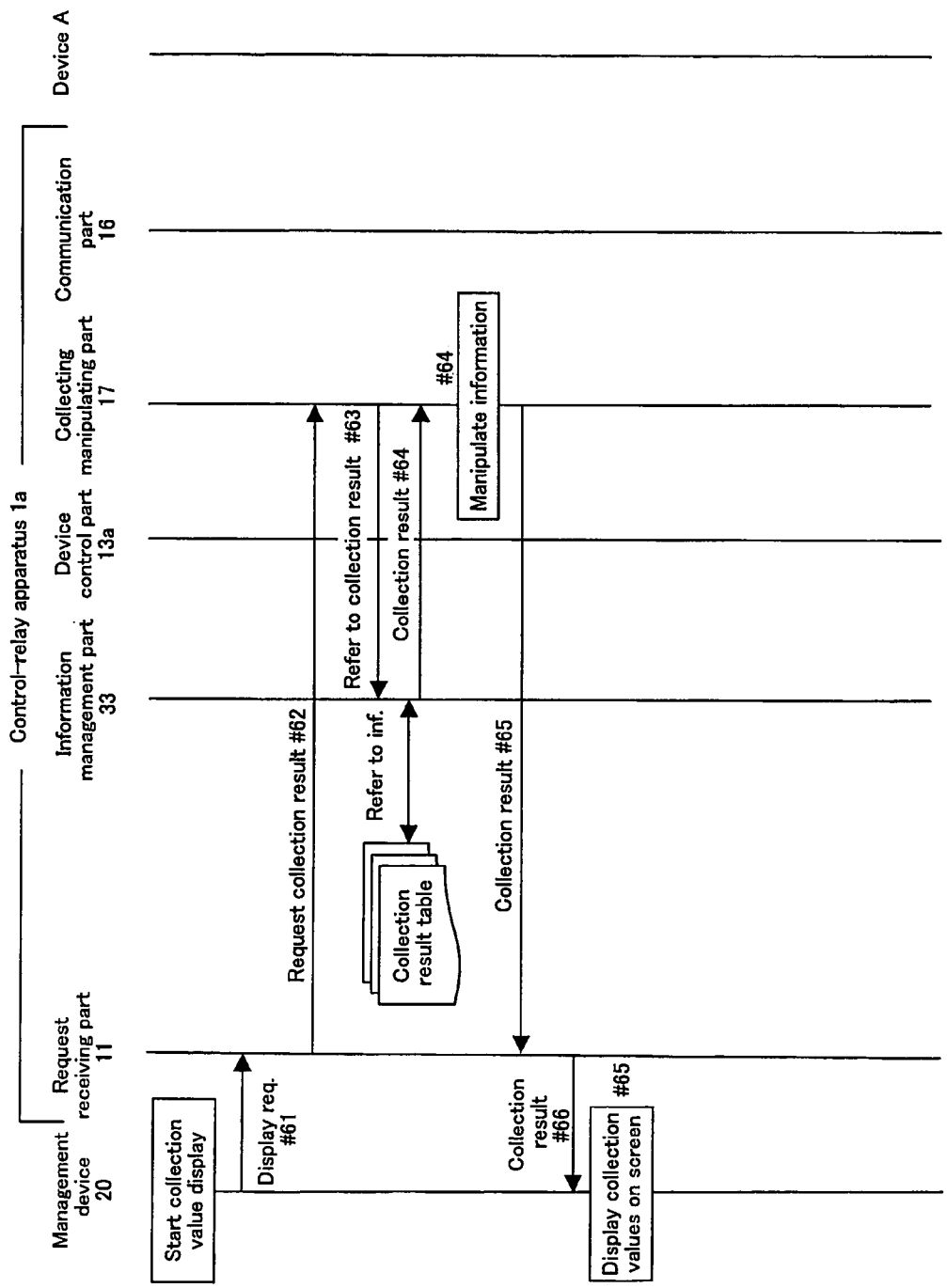
FIG. 12 is a sequence diagram illustrating a processing in which a management device 20 refers to collection values in a collection result table.

Next, a processing of the management device 20 referring to collection values in the collection result table, which have been accumulated in the above-described processing, is described with reference to a sequence diagram of FIG. 12. In FIG. 12, the management device 20 transmits a display request message to the request receiving part 11 (#61). When receiving this display request message, the request receiving part 11 then sends the collecting manipulating part 17a request for reference to collection results (#62). The collecting manipulating part 17 sends the information management part 12 a reference request, according to a reference demand. The information management part 12 searches the collection result table for information that matches the reference request, and responds to the request by sending the search result as a collection result (#64). The collection manipulation part 17, if necessary, manipulates the collection result thus sent thereto as a response so that the result should be displayed (#64), and sends the same to the request receiving part 11 (#65). The request receiving part 11 sends the collection result to the management device 20 as a response (#66). The management device 20 carries out screen display of the collection result (#65).

Embodiment 3

Figure 13:
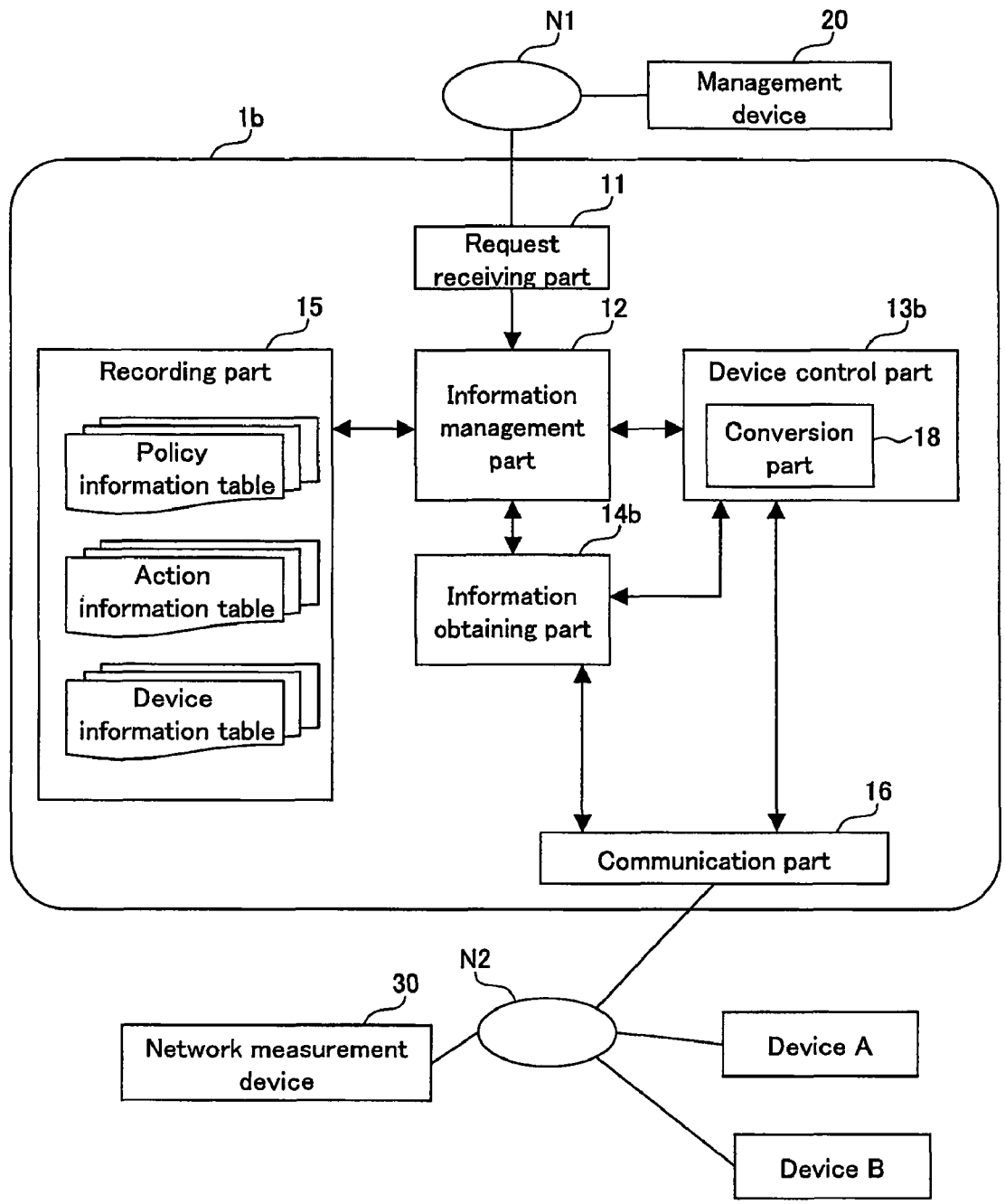
FIG. 13 is a functional block diagram illustrating a configuration of a control-relay apparatus $1b$ according to Embodiment 3.

FIG. 13 is a functional block diagram illustrating a configuration of a control-relay apparatus 1b according to the present embodiment. In FIG. 13, the same functional blocks as those in FIG. 2 are denoted with the same numerals. The control-relay apparatus 1b of the present embodiment further has a function of, if a format of an action contained in control request data received from the management device 20 is not in conformity with a protocol of a device to be controlled, converting the format of the action into a format in conformity with the protocol of the device to be controlled. More specifically, the device control part 13b in the control-relay apparatus 1b is provided with a conversion part 18. Further, a device information table is recorded in the recording part 15 additionally.

In the device information table, data indicating respective communication formats of devices communicable with the control-relay apparatus 1b are recorded. FIG. 14 illustrates exemplary data contents to be recorded in the device information table. In this example, a set of a device ID, a communication format, and control information is recorded as one record. The communication format is information that specifies a protocol used for communication between the devices and the control-relay apparatus 1b. The control information is other information necessary for controlling the devices.

The data in the device information table can be obtained, for example, in the following manner: the information obtaining part 14b detects devices on the network N2 by broadcasting, and sends the detected devices a message that requests information necessary for control. Alternatively, the information obtaining part 14b may obtain respective communication formats of all the devices on the network N2 from the network measurement device 30.

The conversion part 18 converts an action in the action information table into a format in conformity with a device to be controlled by the device control part 13, by referring to the device information table. In other words, the device control part 13 converts a format of an action into a format in conformity with a protocol of a device determined to satisfy conditions of a control policy (a device to be controlled).

[Processing of Determining and Converting Control Policy and Executing Action]

Figure 15:
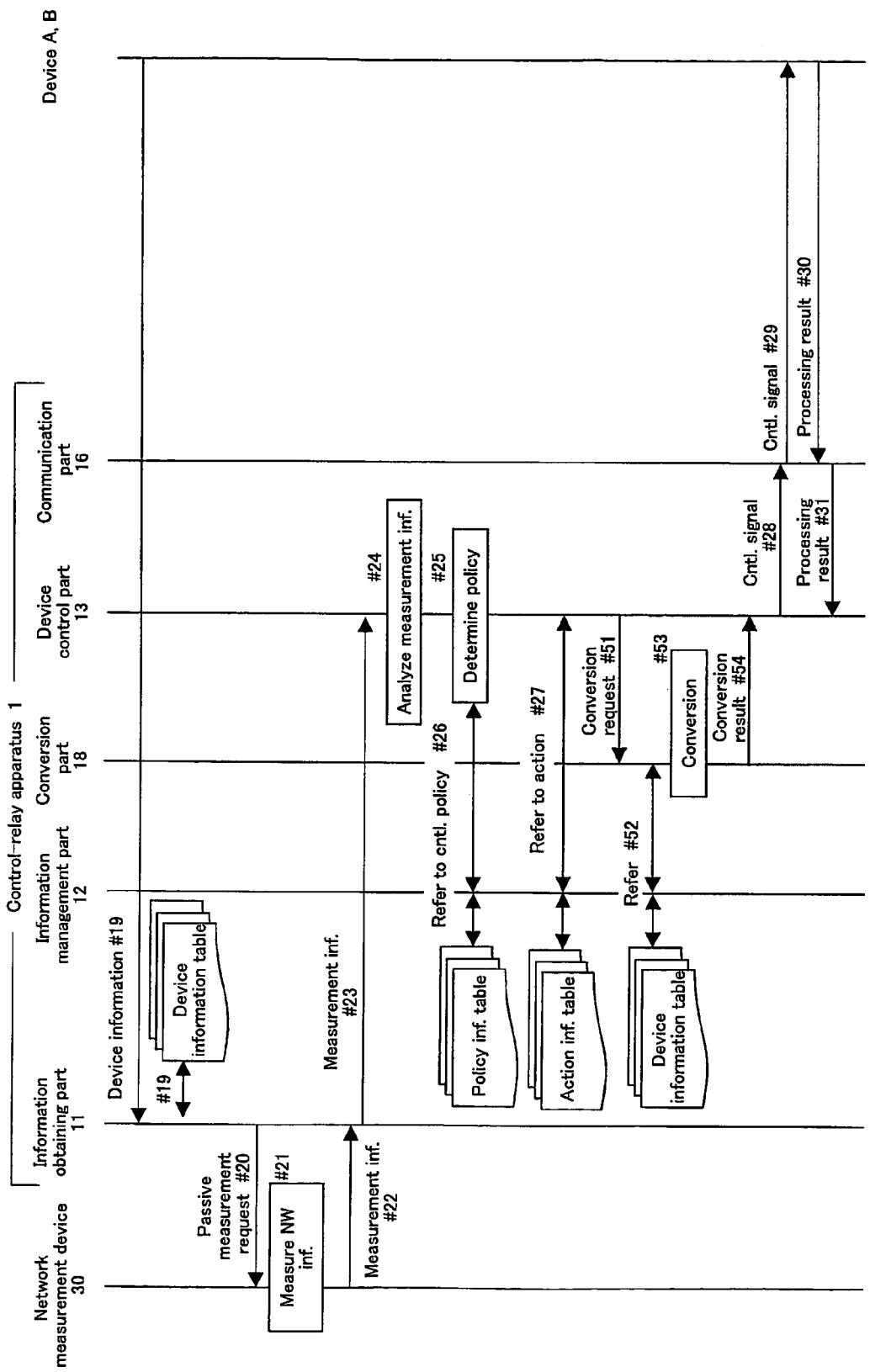
FIG. 15 is a sequence diagram illustrating an exemplary processing for converting an action and executing the same.

The following describes an exemplary processing in which the control-relay apparatus 1b specifies a device to be controlled, according to a control policy, based on data obtained from the network measurement device 30, and executes an action converted into a format in conformity with a protocol of the device to be controlled. FIG. 15 is a sequence diagram illustrating an exemplary processing in which the control-relay apparatus 1b specifies a device to be controlled, based on device data obtained from the network measurement device 30, converts an action with respect to this device to be controlled, into a format in conformity with a protocol of the foregoing device, and executes the action.

In FIG. 15, first, the information obtaining part 14b obtains device information from the devices A and B connected with the network N1, and records the device information in the device information table (#19). The device information contains protocols of the devices A and B, and other information necessary for control. The information obtaining part 14b is allowed to obtain device information by, for example, broadcasting a message that requests respective protocols of devices and information necessary for control. It should be noted, however, that the method for obtaining device information is not limited to this.

The processing of #20 to #27 as follows is similar to #20 to #27 in FIG. 7. To describe specifically, at #26, a device to be controlled in conformity with the control policy is specified, and at #27, an action with respect to the device to be controlled is specified. When the device to be controlled and the action with respect to the device are thus specified, the device control part 13 notifies the device to be controlled and the action to the conversion part 18, and requests the conversion part 18 to convert the action (#51).

The conversion part 18 specifies a communication format (protocol) of the device to be controlled, by referring to the device information table (#52). In the case where control information necessary for control of the device to be controlled is recorded additionally in the device information table, the conversion part 18 may obtain the control information also.

Then, the conversion part 18 converts the action so that the action becomes in conformity with the communication format of the device to be controlled (#53). The conversion processing of the present example is a processing for converting control contents indicated by an action so that the action becomes in conformity with a protocol of a device to be controlled. For example, the conversion part 18 converts notation formats of "Action command" and "Detailed control content" in a record of an action into formats in conformity with a protocol of a device to be controlled.

For example, in the case where an action command, detailed control contents, and a protocol of a device to be controlled are "SNMPGET periodical issuance", "OID 1.1.1.1, 60 sec, calculation expression=difference from previous value", and "NETCONF", respectively, an action command is converted to "XML-RPC (XML-Remote Procedure Call)". In this case, the detailed control contents may be converted to data indicating control contents as described below, for example. The data as described below allow a registration type, an IP address of a device to be controlled, an OID value, a cycle, and a calculation expression type to be passed as parameters between devices.

```
<?xml version="1.0"?>
  <methodCall> XML-RPC
  <methodName>SNMPCollectRequest</methodName>
  <params>
  <param>
  <value>addFixedCycle</value>
  <value>192.168.0.1</value>
  <value>1.1.1.1</value>
  <value>60</value>
  <value>1</value>
  </param>
  </params>
  </methodCall>
```

The above-described data are an example based on an assumption that a control device that obtains SNMP corresponds to NETCONF; data after conversion however are not limited to the foregoing example.

It should be noted that in the case where management is carried out in a state where one device to be controlled serves as a representative of a plurality of devices and interfaces, information including a communication format of each of devices under the management is recorded in the device information table as control information. By using this control information, a control operation instruction with respect to one device to be controlled can be converted to control operation information with respect to each of devices under the management of the foregoing control device.

The method of converting a protocol is not limited to the above-described example. For instance, in the case where a VPN setting is recorded in the NETCONF format in a field for the detailed control contents, contents of the foregoing VPN setting can be converted to those in a CLI format.

The action thus converted is notified to the device control part 13 (#54). The device control part 13, following the action thus notified, transmits a control signal according to a command of a protocol in conformity with the device to be controlled. This makes it possible to control devices with various protocols. In other words, this results in that it is not necessarily required for the management device 20 to designate a protocol of a device to be controlled. Besides, this also results in that a difference between the protocol of the management device 20 and the protocol of the device to be controlled is also absorbed by the control-relay apparatus 1b. Thus, the control-relay apparatus 1b also has a function as a protocol proxy server.

For example, in order that network equipment corresponds to a NETCONF protocol, the network equipment has to implement a protocol stack such as HTTP (Hypertext Transfer Protocol), HTTPS (Hypertext Transfer Protocol Security), SOAP (Simple Object Access Protocol), or NETCONF. Therefore, in some cases, it is difficult that all the devices connected with the network N2 correspond to NETCONF. Even in such a case, the control-relay apparatus 1b according to the present embodiment is capable of controlling both of devices that can correspond to NETCONF and those which do not, in the same manner according to a control policy and an action. In this case, the management device 20 is capable of transmitting control request data, irrespective of whether a device to be controlled corresponds to NETCONF or not.

It should be noted that the above-described embodiment is an example in which an action is converted to a protocol in conformity with a device to be controlled, but it also is possible to, for example, convert data to be transmitted from the control-relay apparatus 1b to the management device into a protocol that corresponds to the management device, in the same manner.

Further, the information obtaining part 14b may periodically receive update information of device information relating to a device communicable with the control-relay apparatus 1b, from an external network (the network measurement device 30, for example), so that data in the device information table are updated. This makes it possible to store the latest device information in the device information table at all the times. Consequently, this enables control with use of the latest protocol suitable for a communication format of a device to be controlled. Furthermore, the timing of obtaining device information is not limited to that of the foregoing example. For instance, at #23, the information obtaining part 14b may receive data indicating a communication format of a device that can be a device to be controlled, when receiving measurement information from the network measurement device 30.

Application Examples of the Above-Described Embodiments, Etc.

The above-described control-relay apparatus 1, 1a, or 1b according to Embodiments 1, 2, or 3 can be used as, for example, a control-relay apparatus for relaying between intrahouse LAN (equivalent to the network N2) to which information equipment in home belongs, and an external network (equivalent to the network N1) such as the Internet to which the intrahouse LAN is connected. By so doing, only transmission of control request data from a management device (management server or terminal) on the external network allows information equipment belonging to the intrahouse LAN to be controlled autonomously. As a result, delicate control of information equipment can be carried out, with a load on the external network and a load on a management device being reduced. For example, control of causing an air conditioner to start operating at a fixed time every day (30 minutes before getting home, for example), or the like is possible.

It should be noted that the use of the control-relay apparatus 1, 1a, or 1b is not limited to this. For example, the above-described control-relay apparatus 1, 1a, or 1b can be applied also in the case where an operation of information equipment on an intracompany LAN, the security setting in a predetermined block, or the like is controlled via an external network.

The present invention is not limited to Embodiments 1 to 3 described above. Further, variations obtained by combining at least two of Embodiments 1 to 3 also are included in the present invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control-relay apparatus that controls a device to be controlled, according to a control request received from a management device, the control-relay apparatus comprising:
a processor, comprising:
a request receiving part that receives, from the management device, control request data containing data indicating a condition that a device to be controlled should satisfy, and data indicating contents of control with respect to a device that satisfies the condition, and stores the control request data in a recording part accessible from the control-relay apparatus in a state where the condition and the contents of control are associated with each other;
an information obtaining part that obtains device data relating to a state or a property of a device communicable with the control-relay apparatus; and
a device control part that, when the state or the property of the device indicated by the device data obtained by the information obtaining part satisfies the condition indicated by the control request data recorded in the recording part, performs control with respect to the device indicated by the device data, the control including the contents of control associated with the condition indicated by the control request data
wherein
the information obtaining part obtains data indicating a communication format of a device communicable with the control-relay apparatus and records the data in association with the device in the recording part,
the control-relay apparatus further comprising:
a converting part that, when a state or a property of the device indicated by the device data obtained by the information obtaining part satisfies the condition indicated by the control request data recorded in the recording part, determines a communication format for the device satisfying the condition by referring to the recording part, and converts the contents of control indicated by the control request data to contents in conformity with the communication format,
wherein with respect to the device satisfying the condition, the device control part executes the control indicated by the control request data converted by the converting part.

2. The control-relay apparatus according to claim 1, wherein
the request receiving part further receives data indicating a method for obtaining device data of the device communicable with the control-relay apparatus, and
the information obtaining part obtains the device data by a method in conformity with the data indicating the obtaining method.

3. The control-relay apparatus according to claim 1, wherein the information obtaining part obtains the device data by transmitting, to the device communicable with the control-relay apparatus, a signal that requests device data relating to a state or a property of the device, and receiving device data from the device.

4. The control-relay apparatus according to claim 1, wherein the information obtaining part obtains the device data from a measurement device that monitors the device communicable with the control-relay apparatus and collects data transmitted/received to/from the device.

5. The control-relay apparatus according to claim 1, wherein the information obtaining part obtains the device data from the device communicable with the control-relay apparatus, by receiving data indicating a control request, together with the data relating to the state or the property of the device.

6. The control-relay apparatus according to claim 2, wherein
the request receiving part of the processor further receives obtaining method data that indicate at least one of obtaining methods (1) to (3) below for obtaining information relating to the device:
(1) a method for obtaining the device data by transmitting, to the device communicable with the control-relay apparatus, a signal that requests device data relating to a state or a property of the device, and receiving device data from the device;
(2) a method for obtaining the device data from a measurement device that monitors the device communicable with the control-relay apparatus and collects data transmitted/received to/from the device; and
(3) a method for obtaining the device data from the device communicable with the control-relay apparatus, by receiving data indicating a control request, together with the data relating to the state or the property of the device, and
the information obtaining part obtains the device data by the obtaining method indicated by the obtaining method data.

7. The control-relay apparatus according to claim 1, wherein
the request receiving part receives, from the management device, control request data containing data indicating condition that a device to be controlled should satisfy, and data indicating contents and a timing of control with respect to a device that satisfies the condition, and stores the control request data in a recording part, and
the device control part controls the device according to the timing and the contents of control indicated by the control request data.

8. The control-relay apparatus according to claim 1, wherein
the request receiving part receives, from the management device, collection setting data that indicate collection information collected from the device satisfying the condition indicated by the control request data recorded in the recording part, and a method for manipulating the collection information, and stores the collection setting data in the recording part, and
the device control part obtains the collection information indicated by the collection setting data from the device satisfying the condition, and manipulates the collection information by the manipulation method indicated by the collection setting data.

9. A non-transitory recording medium storing a control-relay program for causing a computer to execute processing of controlling a device to be controlled, based on a control request received from a management device, the control-relay program causing the computer to execute:
request reception processing of receiving, from the management device, control request data containing data indicating condition that a device to be controlled should satisfy, and data indicating contents of control with respect to a device that satisfies the condition, and storing the control request data in a recording part accessible from a control-relay apparatus in a state where the condition and the contents of control are associated with each other;

information obtainment processing of obtaining device data relating to a state or a property of a device communicable with the control-relay apparatus; and device control processing of, when the state or the property of the device indicated by the device data obtained by the information obtainment processing satisfies the condition indicated by the control request data recorded in the recording part, performing control with respect to the device indicated by the device data, the control including the contents of control associated with the condition indicated by the control request data wherein the information obtainment processing includes processing of obtaining data indicating a communication format of a device communicable with the control-relay apparatus, and recording the data in association with the device in the recording part, the control-relay program causing the computer to further execute:

conversion processing of, when a state or a property of the device indicated by the device data obtained by the information obtainment processing satisfies the condition indicated by the control request data recorded in the recording part, determining a communication format for the device satisfying the condition by referring to the recording part, and converting the contents of control indicated by the control request data to contents in conformity with the communication format, wherein the device control processing includes processing of executing the control indicated by the control request data converted by the conversion processing, with respect to the device satisfying the condition.

10. The recording medium storing the control-relay program according to claim 9, wherein the request reception processing includes processing of further receiving data indicating a method for obtaining device data of the device communicable with the control-relay apparatus, and the information obtainment processing includes processing of obtaining the device data by a method in conformity with the data indicating the obtaining method.

11. The recording medium storing the control-relay program according to claim 9, wherein the information obtainment processing includes processing of obtaining the device data by transmitting, to the device communicable with the control-relay apparatus, a signal that requests device data relating to a state or a property of the device, and receiving device data from the device.

12. The recording medium storing the control-relay program according to claim 9, wherein the information obtainment processing includes processing of obtaining the device data from a measurement device that monitors the device communicable with the control-relay apparatus and collects data transmitted/received to/from the device.

13. The recording medium storing the control-relay program according to claim 9, wherein the information obtainment processing includes processing of obtaining the device data from the device communicable with the control-relay apparatus, by receiving data indicating a control request, together with the data relating to the state or the property of the device.

14. The recording medium storing the control-relay program according to claim 10, wherein the request reception processing includes processing of further receiving obtaining method data that indicate at least one of obtaining methods (1) to (3) below for obtaining information relating to the device:

(1) a method for obtaining the device data by transmitting, to the device communicable with the control-relay apparatus, a signal that requests device data relating to a state or a property of the device, and receiving device data from the device;

(2) a method for obtaining the device data from a measurement device that monitors the device communicable with the control-relay apparatus and collects data transmitted/received to/from the device; and (3) a method for obtaining the device data from the device communicable with the control-relay apparatus, by receiving data indicating a control request, together with the data relating to the state or the property of the device, and the information obtainment processing includes processing of obtaining the device data by the obtaining method indicated by the obtaining method data.

15. The recording medium storing the control-relay program according to claim 9, wherein the request reception processing includes processing of receiving, from the management device, control request data containing data indicating condition that a device to be controlled should satisfy, and data indicating contents and a timing of control with respect to a device that satisfies the condition, and storing the control request data in a recording part, and the device control processing includes processing of controlling the device according to the timing and the contents of control indicated by the control request data.

16. The recording medium storing the control-relay program according to claim 9, wherein the request reception processing includes processing of receiving, from the management device, collection setting data that indicate collection information collected from the device satisfying the condition indicated by the control request data recorded in the recording part, and a method for manipulating the collection information, and stores the collection setting data in the recording part, and the device control processing includes processing of obtaining the collection information indicated by the collection setting data from the device satisfying the condition, and manipulates the collection information according to the manipulation method indicated by the collection setting data.

17. A control-relay method for controlling a device to be controlled according to a control request received from a management device, the method being executed by a computer communicable with the management device and the device to be controlled, the control-relay method comprising:

a request receiving step in which the computer receives, from the management device, control request data containing data indicating condition that a device to be controlled should satisfy, and data indicating contents of control with respect to a device that satisfies the condition, and stores the control request data in a recording part accessible from a control-relay apparatus in a state where the condition and the contents of control are associated with each other;

an information obtaining step in which the computer obtains device data relating to a state or a property of a device communicable with the computer; and a device control step in which, when the state or the property of the device indicated by the device data obtained in the information obtaining step satisfies the condition indicated by the control request data recorded in the recording part, the computer performs control with respect to the device indicated by the device data, the control including the contents of control associated with the condition indicated by the control request data wherein the information obtainment processing includes processing of obtaining data indicating a communication format of a device communicable with the control-relay apparatus, and recording the data in association with the device in the recording part, the control-relay program causing the computer to further execute:

conversion processing of, when a state or a property of the device indicated by the device data obtained by the information obtainment processing satisfies the condition indicated by the control request data recorded in the recording part, determining a communication format for the device satisfying the condition by referring to the recording part, and converting the contents of control indicated by the control request data to contents in conformity with the communication format wherein the device control processing includes processing of executing the control indicated by the control request data converted by the conversion processing, with respect to the device satisfying the condition.

\* \* \* \* \*